United States Patent
de la Torre et al.

(10) Patent No.: US 9,846,615 B2
(45) Date of Patent: Dec. 19, 2017

(54) DATA STORAGE SYSTEM AND METHOD BY SHREDDING AND DESHREDDING

(71) Applicant: CLEVERSAFE, INC., Chicago, IL (US)

(72) Inventors: Douglas R. de la Torre, Kirkland, WA (US); David W. Young, North Bend, WA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 84 days.

(21) Appl. No.: 14/556,703

(22) Filed: Dec. 1, 2014

(65) Prior Publication Data

US 2015/0089318 A1 Mar. 26, 2015

Related U.S. Application Data

(63) Continuation of application No. 14/321,629, filed on Jul. 1, 2014, which is a continuation of application (Continued)

(51) Int. Cl.
*G06F 11/14* (2006.01)
*H03M 7/30* (2006.01)
(Continued)

(52) U.S. Cl.
CPC ...... *G06F 11/1412* (2013.01); *G06F 11/1076* (2013.01); *G06F 11/1402* (2013.01);
(Continued)

(58) Field of Classification Search
CPC .. G06F 11/08; G06F 11/1412; G06F 11/1402; G06F 11/1076; G06F 17/30371;
(Continued)

(56) References Cited

U.S. PATENT DOCUMENTS

| | | | |
|---|---|---|---|
| 5,031,218 A * | 7/1991 | Galand et al. | 704/233 |
| 7,222,257 B1 * | 5/2007 | Dibb | G06F 11/1662 |
| | | | 711/114 |
| 2002/0146074 A1 * | 10/2002 | Ariel | H03M 13/27 |
| | | | 375/240.27 |

FOREIGN PATENT DOCUMENTS

WO WO 02093846 A1 * 11/2002

OTHER PUBLICATIONS

Braunstein, A Quantum Analog of Huffman Coding, IEEE Transactions on Information Theory, vol. 46, No. 4, Jul. 2000, pp. 1644-1649.*

(Continued)

*Primary Examiner* — Albert Phillips, III
(74) *Attorney, Agent, or Firm* — Garlick & Markison; Timothy W. Markison; Randy W. Lacasse

(57) ABSTRACT

A system and method for data storage by shredding and deshredding of the data allows for various combinations of processing of the data to provide various resultant storage of the data. Data storage and retrieval functions include various combinations of data redundancy generation, data compression and decompression, data encryption and decryption, and data integrity by signature generation and verification. Data shredding is performed by shredders and data deshredding is performed by deshredders that have some implementations that allocate processing internally in the shredder and deshredder either in parallel to multiple processors or sequentially to a single processor. Other implementations use multiple processing through multi-level shredders and deshredders. Redundancy generation includes implementations using non-systematic encoding, systematic encoding, or a hybrid combination. Shredder based tag generators and (Continued)

deshredder based tag readers are used in some implementations to allow the deshredders to adapt to various versions of the shredders.

24 Claims, 39 Drawing Sheets

Related U.S. Application Data

No. 13/051,897, filed on Mar. 18, 2011, now Pat. No. 8,805,792, which is a continuation of application No. 12/623,234, filed on Nov. 20, 2009, now Pat. No. 7,933,876, which is a continuation of application No. 10/234,636, filed on Sep. 3, 2002, now Pat. No. 7,636,724.

(60) Provisional application No. 60/316,601, filed on Aug. 31, 2001.

(51) Int. Cl.
*H04L 9/32* (2006.01)
*G06F 21/60* (2013.01)
*G06F 17/30* (2006.01)
*G06F 11/10* (2006.01)
*H03M 13/29* (2006.01)

(52) U.S. Cl.
CPC ...... *G06F 17/30371* (2013.01); *G06F 21/602* (2013.01); *H03M 7/30* (2013.01); *H03M 13/29* (2013.01); *H04L 9/3247* (2013.01); *G06F 2201/80* (2013.01); *H04L 2209/30* (2013.01); *Y10S 707/99942* (2013.01); *Y10S 707/99943* (2013.01)

(58) Field of Classification Search
CPC .. G06F 21/602; G06F 2201/80; H03M 13/29; H03M 7/30; H04L 9/3247; H04L 2209/30; Y10S 707/99943; Y10S 707/99942
See application file for complete search history.

(56) References Cited

OTHER PUBLICATIONS

Sankaran, Reed Solomon Decoder: TMS320C64x Implementation, Dec. 2000. pp. 1-70.*
Micolau, Hamming Block Codes Jan. 2000, pp. 1-18.*
Plank, A Tutorial on Reed-Solomon Coding for Fault-Tolerance in RAID-like Systems, Feb. 19, 1999, pp. 1-19.*
Basic RAID Organizations, Feb. 21, 2001, pp. 1-5.*
Dingledine, The Free Haven Project: Distributed Anonymous Storage Service, 2000, pp. 1-23.*
Dingledine, The Free Haven Project: Design and Deployment of an Anonymous Secure Data Haven, May 22, 2000, pp. 1-131.*

* cited by examiner

SHREDDING METHOD

TABLE OF ALLOWED TRANSFORM COMBINATIONS FOR FIRST AND SECOND TRANSFORMERS

| RULE | 1st Transformer $E_{pre}$ | 2nd Transformer Advantages |||||||||||| |
|---|---|---|---|---|---|---|---|---|---|---|---|---|
| | | 1 | 2 | 3 | 4 | 5 | 6 | 7 | 8 | 9 | 10 | 11 | 12 |
| 1  | E       |   |   |   |   |   |   | 7 | 8 |   |    |    |    |
| 2  | S       | 1 |   |   |   |   |   |   |   |   |    |    |    |
| 3  | A       |   | 2 |   |   |   |   |   |   |   |    |    |    |
| 4  | C       |   |   | 3 |   |   |   |   |   |   |    |    |    |
| 5  | E A     |   | 2 |   |   |   |   | 7 | 8 |   |    |    |    |
| 6  | E S     |   |   |   |   |   | 6 | 7 | 8 |   |    |    |    |
| 7  | S A     | 1 | 2 |   |   |   |   |   |   |   |    |    | 12 |
| 8  | S C     | 1 |   | 3 |   |   |   |   |   |   |    |    |    |
| 9  | S E     | 1 |   |   |   |   |   | 7 | 8 |   |    |    |    |
| 10 | A C     |   | 2 | 3 |   |   |   |   |   |   |    | 11 |    |
| 11 | A E     |   | 2 |   | 4 |   |   | 7 |   | 9 |    |    |    |
| 12 | A S     |   | 2 |   |   |   | 6 |   |   |   | 10 |    |    |
| 13 | C A     |   | 2 | 3 |   | 5 |   |   |   |   |    |    |    |
| 14 | C E     |   |   | 3 |   |   |   | 7 | 8 |   |    |    |    |
| 15 | C S     |   |   | 3 |   |   | 6 |   |   |   |    |    |    |
| 16 | E A S   |   | 2 |   |   |   | 6 | 7 | 8 |   |    |    |    |
| 17 | E S A   |   | 2 |   |   |   | 6 | 7 | 8 |   |    |    | 12 |
| 18 | S A C   | 1 | 2 | 3 |   |   |   |   |   |   |    | 11 | 12 |
| 19 | S A E   | 1 | 2 |   | 4 |   |   | 7 |   | 9 |    |    | 12 |
| 20 | S C A   | 1 | 2 | 3 |   | 5 |   |   |   |   |    |    | 12 |
| 21 | S C E   | 1 |   | 3 |   |   |   | 7 | 8 |   |    |    |    |
| 22 | S E A   | 1 | 2 |   |   |   |   | 7 | 8 |   |    |    | 12 |
| 23 | A C E   |   | 2 | 3 | 4 |   |   | 7 |   | 9 |    | 11 |    |
| 24 | A C S   |   | 2 | 3 |   |   | 6 |   |   |   | 10 | 11 |    |
| 25 | A E S   |   | 2 |   | 4 |   | 6 | 7 |   | 9 | 10 |    |    |
| 26 | A S C   |   | 2 | 3 |   |   | 6 |   |   |   |    | 11 |    |
| 27 | A S E   |   | 2 |   | 4 |   | 6 | 7 |   | 9 | 10 |    |    |
| 28 | C A E   |   | 2 | 3 | 4 | 5 |   | 7 |   | 9 |    |    |    |
| 29 | C A S   |   | 2 | 3 |   | 5 | 6 |   |   |   | 10 |    |    |
| 30 | C E A   |   | 2 | 3 |   | 5 |   | 7 | 8 |   |    |    |    |
| 31 | C E S   |   |   | 3 |   |   | 6 | 7 | 8 |   |    |    |    |
| 32 | C S A   |   | 2 | 3 |   | 5 | 6 |   |   |   |    |    | 12 |
| 33 | C S E   |   |   | 3 |   |   | 6 | 7 | 8 |   |    |    |    |
| 34 | S A C E | 1 | 2 | 3 | 4 |   |   | 7 |   | 9 |    | 11 | 12 |
| 35 | S C A E | 1 | 2 | 3 | 4 | 5 |   | 7 |   | 9 |    |    | 12 |
| 36 | S C E A | 1 | 2 | 3 |   | 5 |   | 7 | 8 |   |    |    | 12 |
| 37 | A C E S |   | 2 | 3 | 4 |   | 6 | 7 |   | 9 | 10 | 11 |    |
| 38 | A C S E |   | 2 | 3 | 4 |   | 6 | 7 |   | 9 | 10 | 11 |    |
| 39 | A S C E |   | 2 | 3 | 4 |   | 6 | 7 |   | 9 | 10 | 11 |    |
| 40 | C A E S |   | 2 | 3 | 4 | 5 | 6 | 7 |   | 9 | 10 |    |    |
| 41 | C A S E |   | 2 | 3 | 4 | 5 | 6 | 7 |   | 9 | 10 |    |    |
| 42 | C E A S |   | 2 | 3 |   | 5 | 6 | 7 | 8 |   | 10 |    |    |
| 43 | C E S A |   | 2 | 3 |   | 5 | 6 | 7 | 8 |   |    |    | 12 |
| 44 | C S A E |   | 2 | 3 | 4 | 5 | 6 | 7 |   | 9 |    |    | 12 |
| 45 | C S E A |   | 2 | 3 |   | 5 | 6 | 7 | 8 |   |    |    | 12 |

Fig. 11

TABLE OF DESCRIPTIONS FOR ADVANTAGES
OF ALLOWED TRANSFORM COMBINATIONS

| Advantage Number | Selection Rule Criteria | Explanation, Advantages |
|---|---|---|
| 1 | ((S) or (S before (C or A or E))) | High data integrity |
| 2 | (A) | High performance |
| 3 | (C and not (E before C)) | Space efficiency |
| 4 | (A before E) | Security |
| 5 | (C before A) | Speed |
| 6 | (S after (A or C or E)) | Data integrity |
| 7 | (E) | Security |
| 8 | ((E) or (E before A)) | High security |
| 9 | (A before E) | High performance security |
| 10 | (A before S) | High performance data integrity |
| 11 | (A before C) | High performance space efficiency |
| 12 | (S before A) | Data integrity |
| 13 | (E before C) (Don't use) | No compression (disadvantage) |

*Fig. 12*

DATA STORAGE SYSTEM AND METHOD BY SHREDDING AND DESHREDDING

CROSS REFERENCE TO RELATED APPLICATIONS

The present U.S. Utility Patent Application claims priority pursuant to 35 U.S.C. §120 as a continuation of U.S. Utility application Ser. No. 14/321,629, entitled "DATA STORAGE SYSTEM AND METHOD BY SHREDDING AND DESHREDDING", filed Jul. 1, 2014, which is a continuation of U.S. Utility application Ser. No. 13/051,897, entitled "DATA STORAGE SYSTEM AND METHOD BY SHREDDING AND DESHREDDING", filed Mar. 18, 2011, now U.S. Pat. No. 8,805,792, issued on Aug. 12, 2014, which is a continuation of U.S. Utility application Ser. No. 12/623,234, entitled "DATA STORAGE SYSTEM AND METHOD BY SHREDDING AND DESHREDDING", filed Nov. 20, 2009, now U.S. Pat. No. 7,933,876, issued on Apr. 26, 2011, which is a continuation of U.S. Utility application Ser. No. 10/234,636, entitled "DATA STORAGE SYSTEM AND METHOD BY SHREDDING AND DESHREDDING", filed Sep. 3, 2002, now U.S. Pat. No. 7,636,724, issued on Dec. 22, 2009, which claims priority pursuant to 35 U.S.C. §119(e) to U.S. Provisional Application No. 60/316,601, entitled "INFORMATION PRESERVATION SYSTEM", filed Aug. 31, 2001, which is hereby incorporated herein by reference in its entirety and made part of the present U.S. Utility Patent Application for all purposes.

BACKGROUND OF THE INVENTION

Field of the Invention

The invention relates, in general, to storage of data and, in particular, to storage of data with enhanced redundancy among other things.

Description of the Related Art

Desired data transmission and storage uses encoding to correct and recover lost or corrupted data. Desired encoding is tailored for high performance to minimize overall impact of the encoding. Conventional systems have a growing demand for data encoding that minimizes the use of computer processing, network bandwidth, and storage resources. Security is also becoming more necessary for conventional systems to prevent unauthorized disclosure of stored or transmitted data.

Although the conventional systems are demanding more of data encoding, conventional encoding is focused mostly on one of the aspects, namely, data reliability. Data reliability is typically handled by conventional systems using such approaches as a redundant array of independent disks (RAID) and other approaches. What these conventional approaches typically lack is a general overall approach that can elegantly and efficiently address in an integrated fashion features such as high performance, scalability, space-efficiency, security, data integrity and reliability.

BRIEF SUMMARY OF THE INVENTION

A shredding and deshredding system for storage and retrieval includes a shredder with an allocator configured to allocate the data into portions; and a plurality of redundancy generators each configured to process at least one of the portions of data to generate for each portion a redundant part of the portion, each portion and redundant part to be stored as a first number of shreds in a shred group. The system further includes a deshredder with a plurality of inverse redundancy generators configured to receive at least one of the shred groups and to output the portion stored in the shred group from a second number of shreds of the received shred group, the second number being smaller than the first number; and a deallocator configured to receive the portions of data outputted by the plurality of inverse redundancy generators and to output the data.

Further embodiments include an allocator configured to allocate to a single processor. Further embodiments include one or more transformers configured to compress the data and one or more inverse transformers configured to decompress the data. Further embodiments include one or more transformers configured to encrypt the data and one or more inverse transformers configured to decrypt the data. Further embodiments include one or more transformers configured to generate signatures regarding the data and one or more inverse transformers configured to verify the signatures. Further embodiments include a plurality of shredders and deshredders in a multi-level configuration. Further embodiments include redundancy generation using version non-systematic encoding.

BRIEF DESCRIPTION OF THE SEVERAL VIEWS OF THE DRAWING(S)

FIG. 11 is a table showing allowed transform combinations for first and second transformers.

FIG. 12 is a table describing advantages of allowed transform combinations.

DETAILED DESCRIPTION OF THE INVENTION

A system and method for shredding and deshredding is described herein to store and retrieve data while emphasizing considerations such as redundancy, integrity, and security of data and scalability and adaptability to resources.

Figure 1:
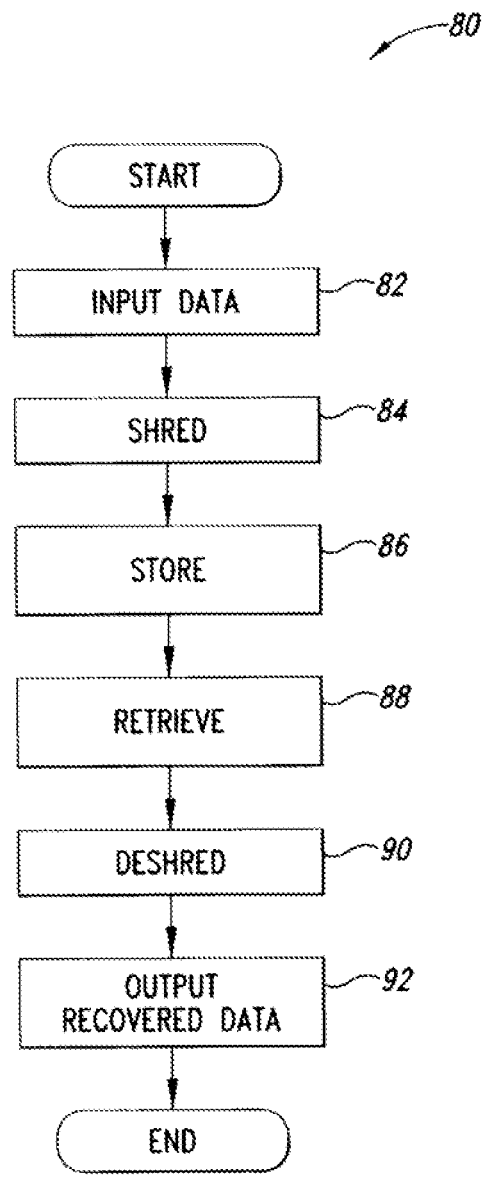
FIG. 1 is a flowchart illustrating a shredding and deshredding method.

As generally depicted in FIG. 1, a shredding and deshredding method 80 begins by receiving input data (step 82), shredding the input data (step 84), and sending the shredded input data to storage (step 86). The input data can be a file or another form that has been generated directly or by other means. Generation of data includes, but is not limited to, generation by operating software programs and by receiving or recording data such as live audio or video, or audio or video broadcast streams.

In the process of shredding, input data is generally transformed into many smaller pieces of data called shreds. Shredding is done in a manner that adds redundancy to the shreds so that the input data can be recovered from a fewer number of shreds than the total number stored. Levels of redundancy can be specified so that multiples of shreds can be lost without preventing the input data from being recovered. Although shredding has been represented in FIG. 1 as one block, the overall process of shredding may involve more than 1 level of shredding in which shreds from an earlier shredding step are used as input data for a later shredding step.

Storage of the shredded input data may involve writing the shredded input data to a single hard disk or single memory or may involve sending it through a transmission medium such as a local bus or a computer network to multiple storage units such as multiple memories on a single computer or multiple computers, multiple hard disks on a single server or multiple servers, or multiple storage devices, other than servers, directly attached to a network.

When the shredded input data that has been stored is later desired, it is retrieved from storage (step 88), deshredded to reassemble the original input data (step 90), and outputted as recovered data that is identical to the original input data (step 92). As discussed, because of the redundancy features inherent in the shreds, fewer shreds than the total number stored need be retrieved in order to reassemble the shreds to recover the original stored input data. Information describing how the shreds were created is used to reassemble the shreds through processes inverse to those used to create the shreds. This information is stored in tags typically found within each shred.

Functions involved with the deshredding are generally opposite of those involved with shredding. A practical difference between shredding and deshredding involves the actual devices used for shredding (shredder) and deshredding (deshredder). Whereas a particular shredder may have a fixed configuration, typically a deshredder is internally configurable since it must handle encoded data from numerous shredders having various configurations. A deshredder is dynamically configured through use of the information contained within the tags found in each of the shreds associated with input data to be reassembled, so that the deshredder performs processes, transforms, or functions inverse to those used by the particular shredder that generated the shreds. For instance, if a particular compression, encryption, or signature generation function was used by a shredder to create shreds of an input file, the tags found in each of the shreds would indicate that this particular compression, encryption, or signature generation function was used by the shredder, so that the deshredder subsequently used to reassemble the shreds to recover the input data would use a complementary decompression, decryption, or signature verification function.

Figure 2:
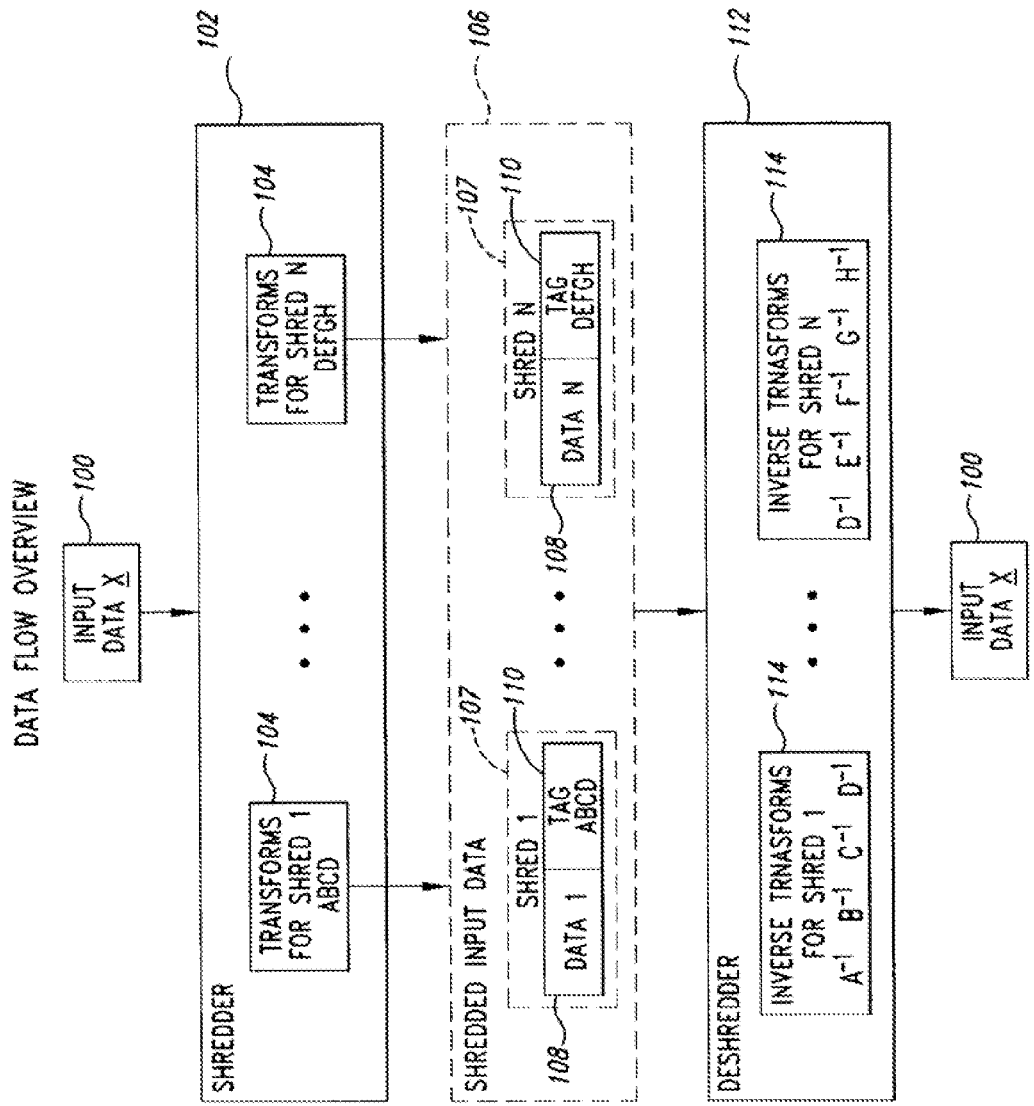
FIG. 2 is an exemplary schematic diagram illustrating a data flow overview of the shredding and deshredding method.

Overall data flow through a shredder and deshredder system is depicted in FIG. 2. Input data 100 is sent to a shredder 102, which has a set of transforms 104 for each shred generated by the shredder. The four transforms 104 used by the shredder 102 to generate the first shred 107 are generally depicted as ABCD and the five transforms used by the shredder to generate the Nth shred are generally depicted as DEFGH to show that the shredder can also be reconfigured to use different transforms even on shreds originating from the same original input data 100. For instance, the shredder 102 may start the shredding process using a certain set of transforms on the first shred 107 that would eventually produce eight shreds to be stored on eight separate storage units. During production of the first shred 107, the shredder 102 may receive updated information that some of the storage units are no longer available. The shredder 102 could then adjust the transforms 104 so that six shreds 107 are produced to be stored on six storage units. Certain of the transforms 104 may be selected to address performance, security, and/or space efficiency issues.

The shredder 102 outputs shredded input data 106 containing a collection of shreds 107. Each of the shreds 107 contains data 108 that is derived from the input data 100 and contains a tag 110 that identifies the transforms used to produce the particular shred. The tag 110 can be represented as metadata, which is data that describes other data. Various conventional software formats, such as XML, and other formats, or a text file or raw binary data file can be used to describe the metadata found in the tag 110, which can include the transformation steps taken, input parameters used, identification of the particular shred, block information related to the shred for aligning and rebuilding blocks of data if appropriate, and other information that could be useful later for the deshredder 112 to reassemble the shreds 107 into the input data 100.

The tag 110 is shown in FIG. 2 as a separate piece of the shred 107; however, the information contained by the tag could be embedded in the shred along with the data contained by the shred rather than being split apart from the data. Under certain circumstances, such as in particular hardware implementations, it may be more conducive to include the information contained by the tag 110 along with the data 108 of the shred 107. In other certain circumstances, such as in particular software implementations, there may be advantages to put the information contained by the tag 110 in a separate file such as a raw binary data file, a text file, an XML file, or other type of file.

When recovery of input data is desired, the shredded input data 106 is sent to a deshredder 112 that performs inverse transforms 114 (A'B'C'D' for the first shred 107 and D'E'F'G'H' for the Nth shred) that are inverses of the specific transforms 104 used to create each particular shred 107 and that are identified by the tag 110 contained within the particular shred.

After performing the inverse transforms 114, the deshredder 112 outputs the input data 100.

Figure 3:
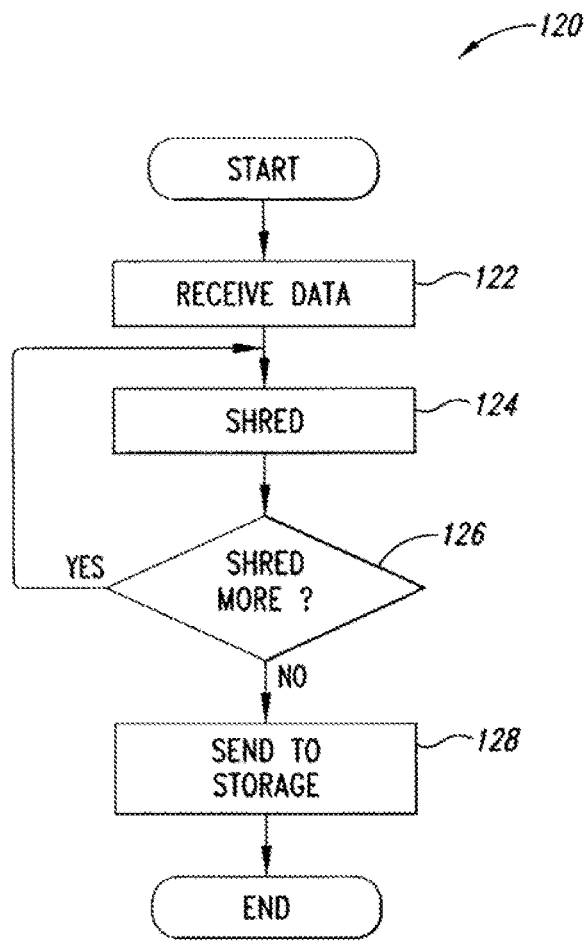
FIG. 3 is an exemplary flow chart elaborating on the shredding method.

As mentioned, the shredding process can be iterative in which the input data 100 is shredded to produce a first set of shreds each containing an amount of data smaller than the input data and then this first set of shreds is further shredded to produce even smaller sized shreds. This iterative aspect is represented by a shredding method 120 as depicted in FIG. 3, which starts by receiving the input data 100 (step 122) and subsequently shredding the input data (step 124) to produce shreds. If the shreds are then to be further shredded (YES branch of decision step 126), the method 120 branches back to step 124. Otherwise (NO branch of decision step 126), the method 120 sends the shreds 107 to storage (step 128) and ends. Multiple passes of shredding can be performed when high levels of data reliability are desired through the data redundancy aspects of the shredding. On other occasions multiple passes of shredding can be useful for splitting up the data to be processed in parallel by multiple processors or to be processed serially by one processor, which has limited memory resources. Since after each pass of shredding the shreds become smaller, there is a limit to the number of shredding passes that can be performed given a particular size of input data. Although method 120 is shown as having a branch back loop to accomplish multiple passes of shredding, typically the multiple passes of shredding can be implemented through a hierarchy of multiple shredders, which is described in further detail below.

Figure 4:
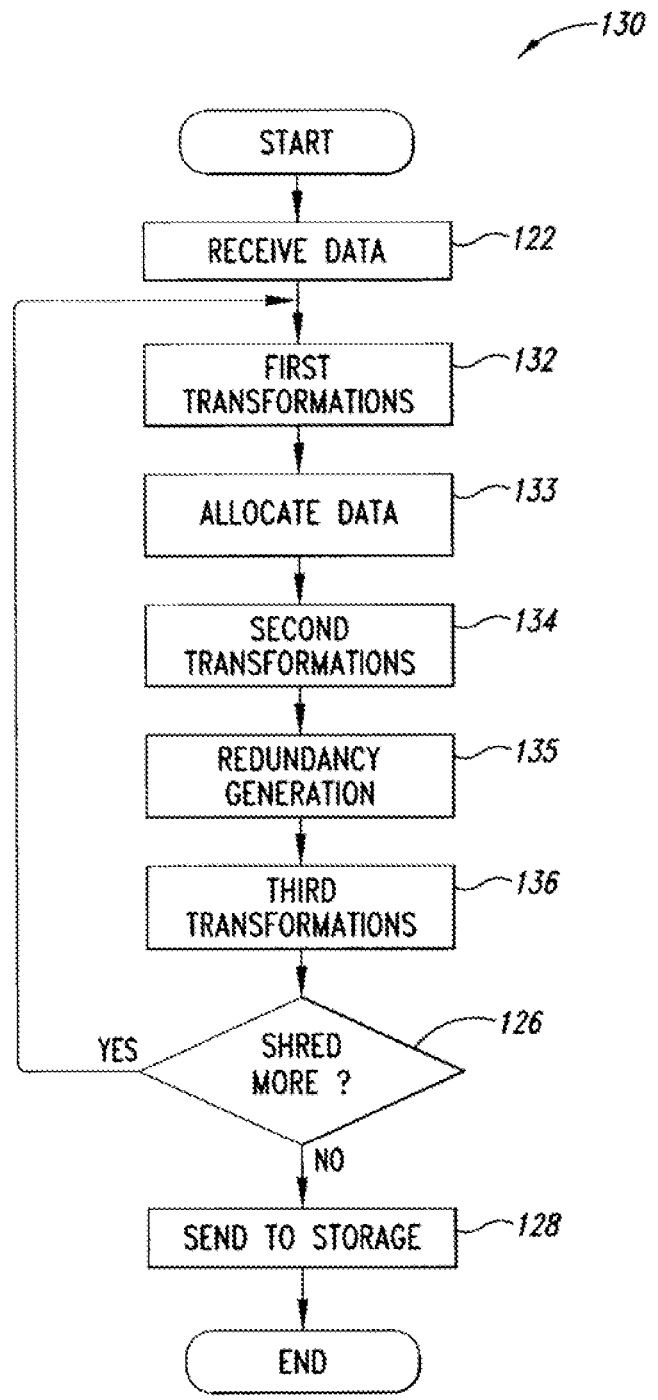
FIG. 4 is an exemplary flow chart further elaborating on the shredding method.

The step of shredding 124 of method 120 and shown in FIG. 3 is further elaborated in a method 130 as shown in FIG. 4. After receiving the input data (step 122), the method goes on to perform the shredding step 124. The shredding step 124 performs first transformations (step 132), allocates data transformed by the first transformations into various different blocks of data (step 133), and performs second transformations on these blocks of data (step 134). The method 120 then further splits the units of data into smaller sized units of data and generates additional redundant data (step 135) so that fewer pieces of stored data are necessary to restore the stored input data. After redundancy generation (step 135), the method 120 then performs third transformations (step 136). In some implementations one or more transformations can be null steps that simply pass data through as unaltered. Other implementations may simply not use some transformations. The first transformations could include one or more of compression, encryption, or signature generation functions.

Allocation (step 133) is not necessarily found in all implementations. Those implementations that use allocation (step 133) split up the data transformed by the first transformations (step 132) to be further processed in parallel by multiple processors or sequentially by one processor with the second transformations (step 134), the redundancy generation (step 135), and the third transformations (step 136). Although the second transformations (step 134) are operationally similar to the first transformations (step 132), generally the second transformations are performed by multiple processors on units of data arranged in parallel and collectively the size of the one unit of data, which is transformed by the first transformations. The third transformations (step 136) can include functions to partition the shredded data based upon the number of storage units available. For instance, if the shredded data has eight shreds, but there are only seven units of storage available, either more than one of the shreds may be placed on one of the units of storage or since the shreds are redundant, one of the shreds may simply be dropped. The third transformations (step 136) can also include signature generation to further improve upon data integrity.

Figure 5:
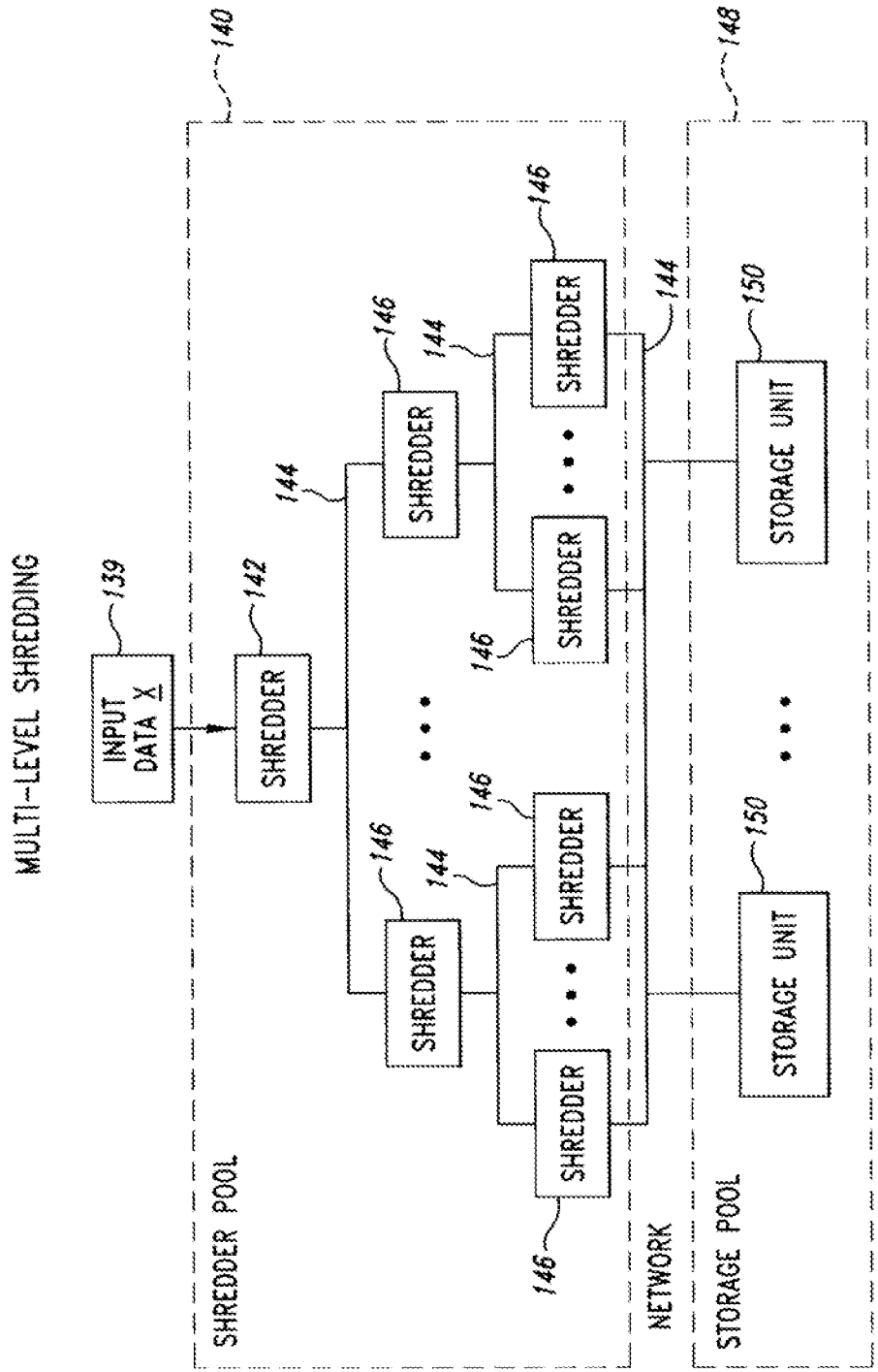
FIG. 5 is a schematic diagram generally showing multi-level shredding.

As mentioned, numerous passes of shredding can be implemented such as the YES branch of decision step 126 in FIGS. 3 and 4. An implementation using numerous passes of shredding is found in FIG. 5 showing a multilevel shredding approach. Input data 139 is sent to a shredder pool 140, which contains a first shredder 142 that receives the input data. The shredder 142 is coupled by an interconnect 144 to a plurality of additional shredders 146 in the shredder pool 140 that successively shred the shredded data outputted by the first shredder 142 based upon their hierarchical position in the levels of multilevel shredders. The levels of additional multilevel shredders 146 are also coupled by interconnects 144.

Exemplary embodiments of the shredder 142 and the additional shredders 146 can be made up of various combinations of multiple chips operating hardcoded based shredding programs, multiple processors/hard drives on a single server having software based shredding programs, and multiple servers containing multiple processors/hard drives having software based shredding programs. The interconnects 144 between chip versions and single server-multiple processor versions of the shredders 142,146 would typically be some form of buses whereas and the interconnects between multiple server versions of the shredders would typically be some form of network communication.

Although three levels of multilevel shredding are shown in FIG. 5, other implementations use different numbers of levels of shredding. The multilevel shredding in FIG. 5 is shown as being symmetric with equal numbers of shredders in each of the respective branches, however, in the other implementations the multilevel shredding uses asymmetrically oriented shredders so that the number of shredders in the respective branches of the multilevel shredding is not necessarily equal.

For instance, one branch of the multilevel shredding may terminate sooner with fewer numbers of shredders than another branch, which may continue to cascade the shredding down through additional shredders. This type of implementation would be found for example with a network in which at least one of the shredders also served as a gateway to some other end point so that the resultant shred on this gateway server would be forwarded on to additional servers. This option of an asymmetric approach to multilevel shredding allows for further scalability of the shredding system to take advantage of existing server resources on network, which may not be distributed or sized accordingly to fully accommodate to a predetermined symmetric pattern.

For example, the resultant multilevel shredding as implemented at least partially on a network may look for a large part as being symmetrically balanced, but upon closer inspection at least some of the branches may not be fully symmetric with respect to one another. This type of partial symmetry has a counterpart in nature where a tree can have an overall symmetry with its branches and leaves, but yet not be fully symmetrical.

A final level of the additional multiple shredders 146 outputs shredded input data to be stored in a storage pool 148 containing multiple storage units 150. The storage units 150 are not limited to particular types of storage, but can be any type of device that can be used to electronically store data. For instance, if a computer has system memory, various portions of this memory can be used as the storage units 150. Other exemplary embodiments could use one or more dedicated hard drives, optical drives, tape drives, flash memory devices, flash memory drives, or other devices capable of electronically storing data for the storage units 150 to persist and store shredded input data.

For higher reliability, the storage units 150 could be physically located separately from one another, typically linked to the shredder by one of the interconnects 144 that is a communication network. In other implementations a single rack containing thousands of hard drives can serve as the storage pool 148 where each of the hard drives is one of the storage units 150. This type of the storage pool 148 could be viewed as a giant highly fault-tolerant drive in which some of the shreds in some of the storage could be lost without losing function of the giant drive.

Figure 6:
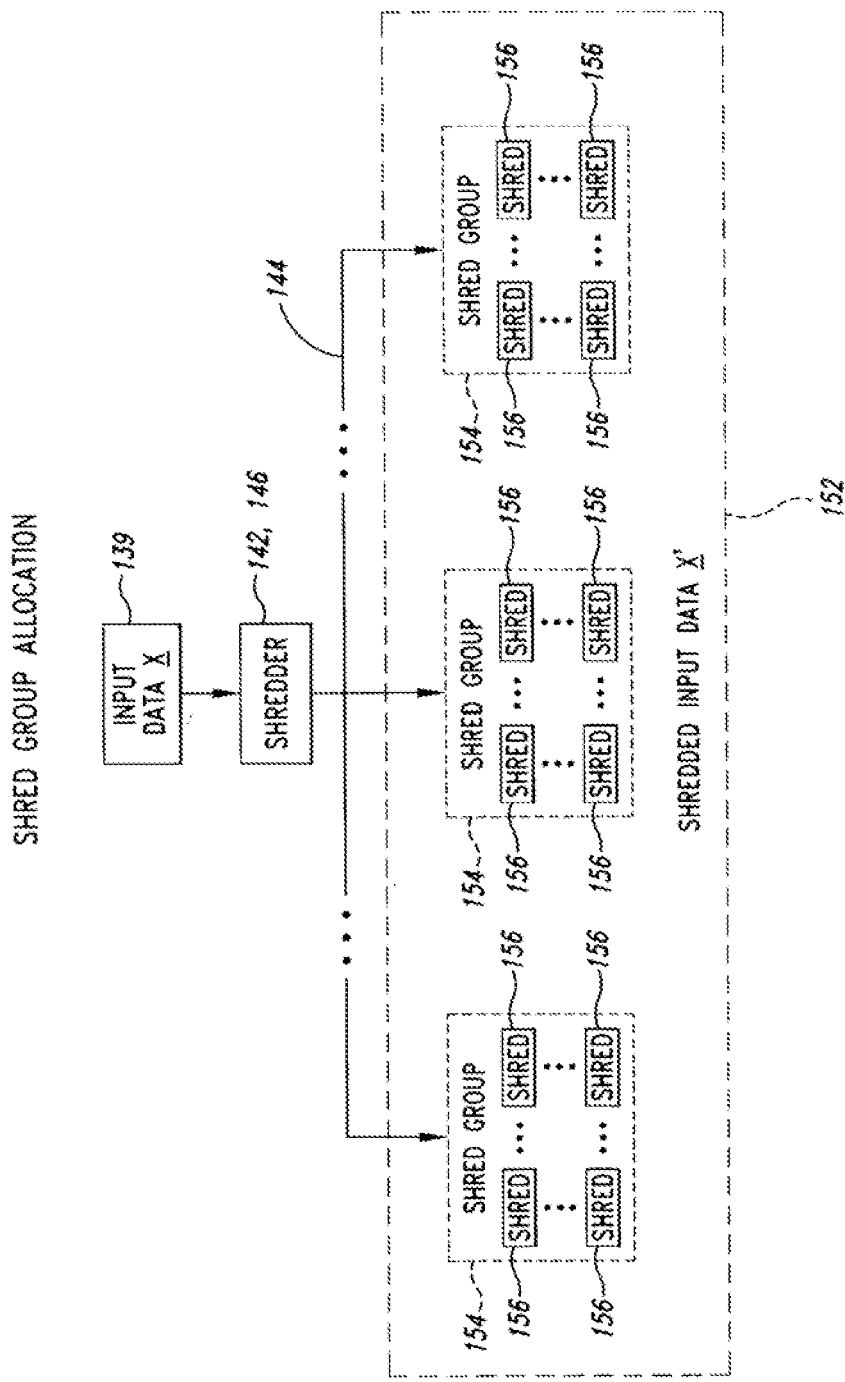
FIG. 6 is a schematic diagram generally showing shred group allocation.

The redundancy generation function (step 135) is generally the shredder function that allows for this multilevel shredding approach based upon the splitting of data by the redundancy generation function. Through the redundancy generation function (step 135), of the one or more second transformation functions (step 134), and any subsequent third transformation functions (step 136), one shred group 154 (where the allocation function (step 133) is not previously performed by the shredder) or a plurality of shred groups (when the allocation function is previously performed by the shredder) is outputted from any one of the shredders 142,146 as shown in FIG. 6. Since the one or more shred groups 154 are produced based upon the redundancy generation function (step 135), each of the shred groups contains a plurality of shreds whose number is determined by the particular redundancy generation function used.

The redundancy generation functions (step 135) of the shredders 146 that are sending the shreds 156 directly to the storage pool 148 are typically chosen based upon the number of storage units 150 found in the storage pool. For example if ten storage units 150 were available then for example one of the shred groups 154 would contain ten shreds 156 to be equally distributed amongst the storage units. In other embodiments, an equal distribution of shreds 156 may not be as desirable such that shreds from at least one of the shred groups 154 may be distributed more with some storage units 150 than other storage units. In other embodiments, one or more shreds 156 of a first shred group 154 could be stored on one of the storage units 150 that also contained one or more shreds from a second shred group.

The plurality of shreds 156 within a particular one of the shred groups 154 share a redundancy relationship with one another in that at least one of the shreds of the same shred group could be lost without hindering recovery of that portion of the input data 139 associated with the particular shred group. In contrast, shreds 156 from a first one of the shred groups 154 do not share a similar redundancy relationship with shreds from a second one of the shred groups so that if too many shreds were lost in the particular first shred group, shreds from the second shred group would not be able to be used to help reconstruct that portion of the input data 139 associated with the first shred group.

Figure 7:
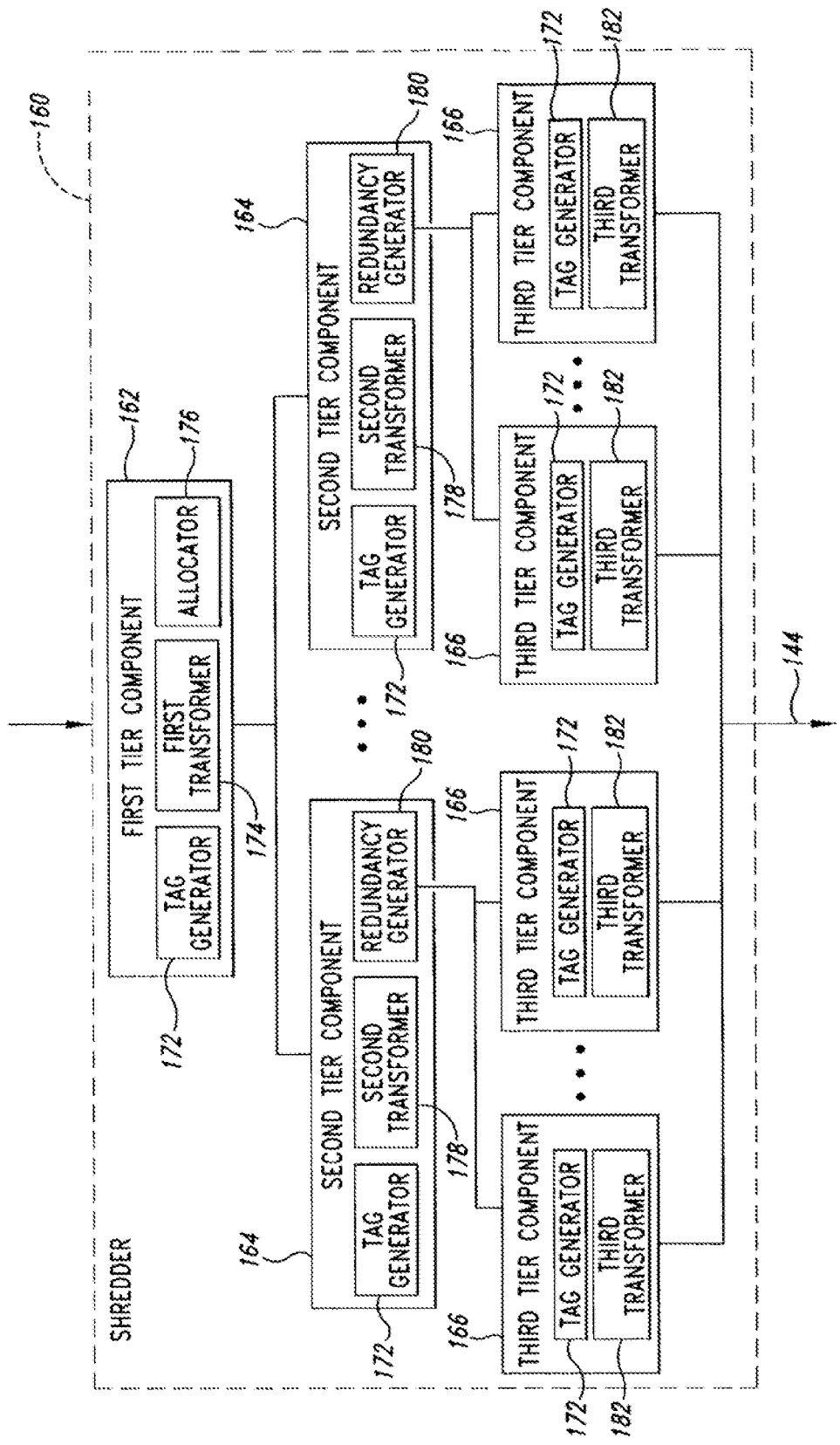
FIG. 7 is a schematic diagram generally showing details of a shredder.

The internal architecture of a shredder 160 is shown in FIG. 7 as having three tiers respectively including a first-tier component 162, a plurality of second-tier component second-tier components 164 coupled to the first tier component and sets of third tier components 166, each set being coupled to a particular second-tier component. The first-tier component includes a tag generator 172, a first transformer 174 performing the first transformation functions (step 132), and an allocator 176. The allocator 176 is used to split up work to be subsequently performed either in parallel by a plurality of second tier components 164 or sequentially by one of the second tier components.

The second-tier components 164 further include tag generators, second transformers 178 performing the second transformation functions (step 134) and redundancy generators 180 performing the redundancy generation function (step 135). The third tier components 166 include tag generators 172 and third transformers 182 performing the third transformation functions (step 136).

The first transformation functions (step 132) of the first transformer 174 can be similar to the second transformation functions (step 134) of the second transformer 178. If work does not have to be so divided to be performed by the second transformers 178, the allocator 176 may not be necessary and the first tier component 162 may merge with the second-tier component 164 to become a single same-tier component. For example if the shredder 160 was implemented in a software system on a single computer then the allocation function (step 133) may not be desired so that there would not necessarily be a distinction between first and second tier components, but would rather be merged into a single tier component in which at least the redundancy generation function (step 135) would be performed.

Furthermore, there could be implementations wherein the redundancy generation function (step 135) would be performed to sequentially generate separate pieces of data such that only one third tier component 166 would be necessary. This one third tier component 166 could then be merged with the single tier component that was a combination of the first-tier component 162 and the second-tier component 164 resulting in the shredder 160 having only one tier component to perform any of the first transformations (step 132), second transformations (step 134), third transformations (step 136), redundancy generation function (step 135), and functions of the tag generators 172. The single tier component would still generally process the transformations in their respective order, as more typically found in the first-tier component 162, the second-tier components 164, and the third tier components 166.

Figure 8:
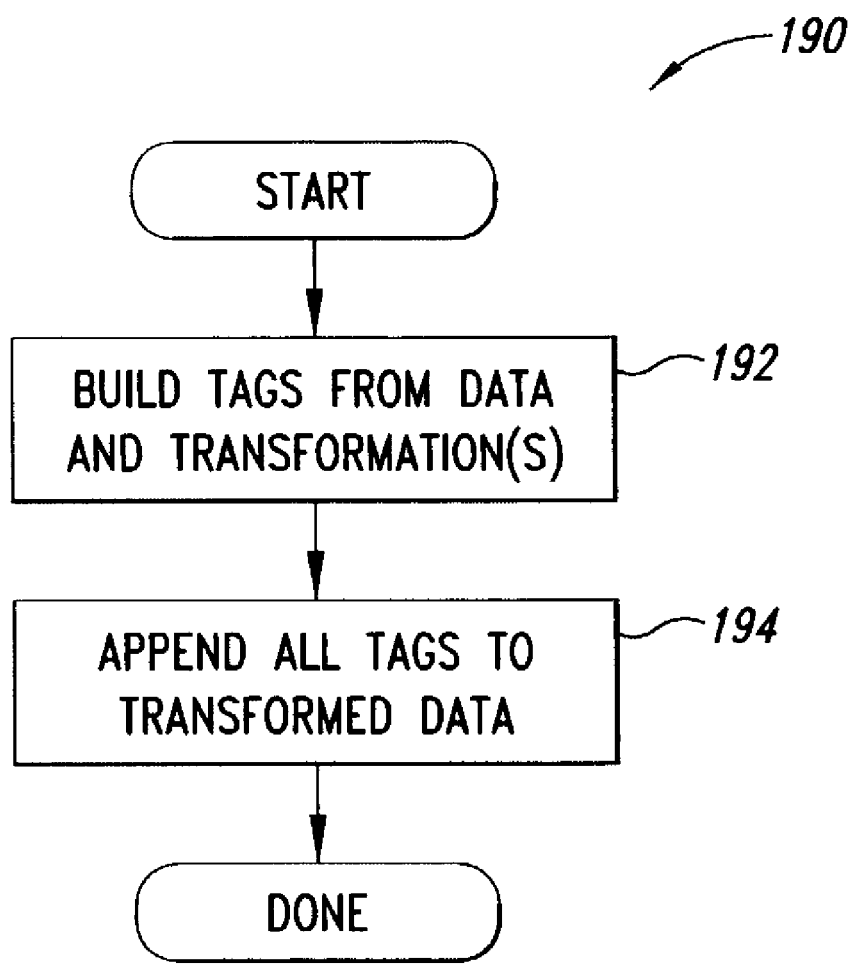
FIG. 8 is a flowchart showing an exemplary tag generator method.

The tag generators 172 are found generally in the first-tier components 162, second-tier components 164, and third tier components 166. An exemplary tag generator method 190, shown in FIG. 8, typically performed by each of the tag generators 172, first generates a tag 110 to be associated with a piece of the input data 139 and a function performed with the piece of the input data by either the first transformer 174, the second transformers 178, or the third transformers 182 (step 192). The tag generator method 190 then finishes by appending the tag 110 to the piece of the input data 139 to end the method.

The tags 110 help keep track of what has been done to the pieces of the input data 139 as the pieces of the input data move through the shredder from the first-tier component 162 to the second-tier components 164 and to the third tier components 166. The tags 110 are used to indicate which functions should be performed in various stages of reconstructing the input data 139 from the shredded input data 132. Each of the tags 110 can contain information about its associated piece of the input data 139 describing such details as data geometries, data relationships, data nesting, structure, coding structure, data alignment, other data descriptions including the size and length, and data qualities such as hash. Each of the tags 110 can also include a schema or a list that generally describes the contents and layout of the data associated with the tag to assist in parsing the data when reconstruction of the input data 139 is desired.

Each of the tags 110 can also contain identifiers of the particular functions performed by the shredder 160 on the associated data piece. Function identifiers could also contain identification of the particular version and mode of the function performed. For example, an encryption function may be used as a certain type of cipher and the cipher block chaining would be a mode of the encryption function. Each of the tags 110 could also include sequencing information, which would call out the order of steps in which the functions were performed. Function version information could identify any parameters that may have changed through the course of shredding by the shredder 160.

Figure 9:
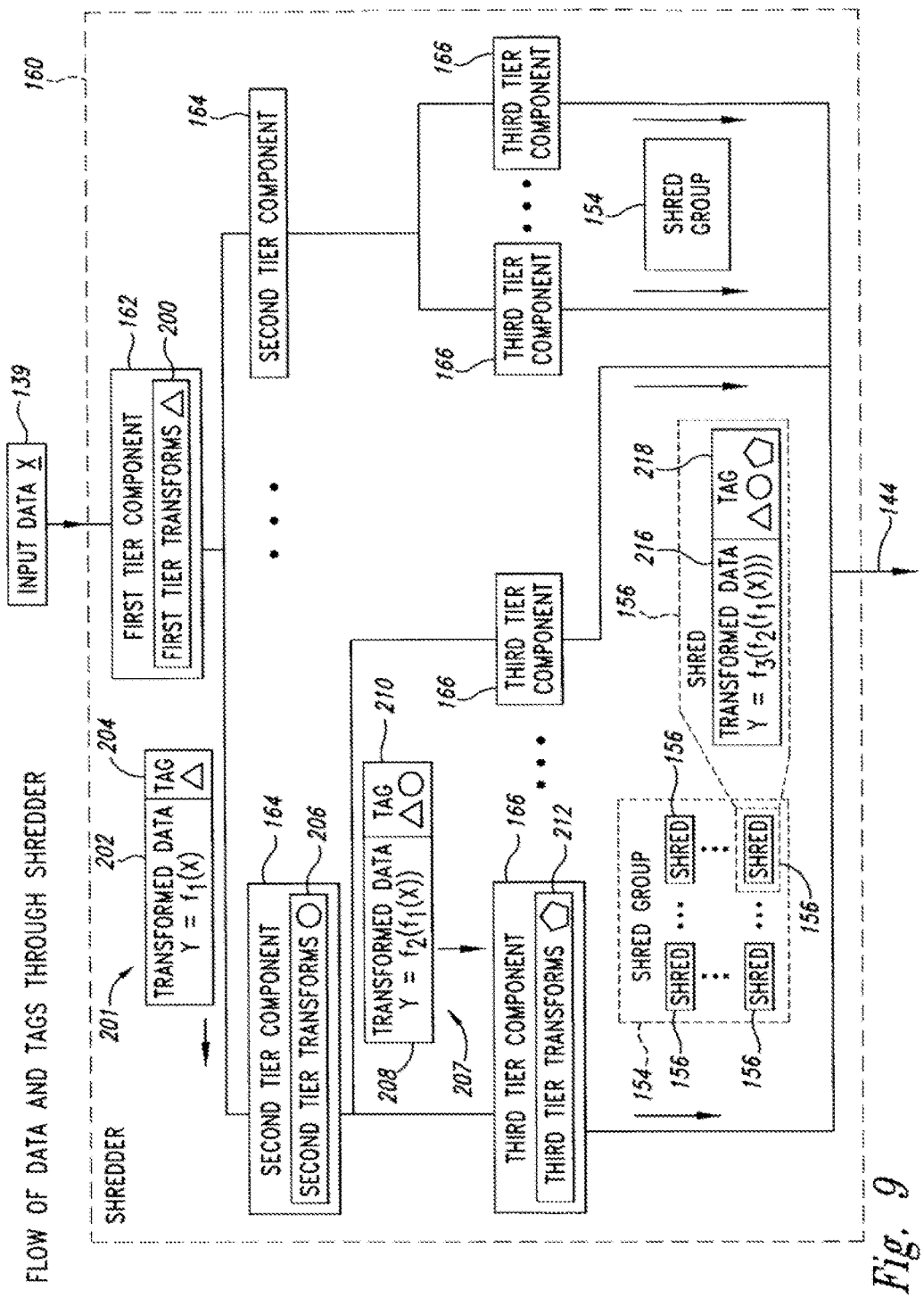
FIG. 9 is a schematic diagram generally showing flow of data and tags through a shredder.

An exemplary flow diagram of the pieces of the input data 139 and the tags 110 associated with these data pieces is depicted in FIG. 9. The input data 139 is received by the shredder 160 through the first-tier component 162, which performs first-tier transforms 200 on the input data. The first-tier transforms 200 generally include the first transformations (step 132) and the data allocation function (step 133) although in particular implementations the first-tier transforms may include fewer functions. The first-tier component 162 outputs a pre-shred 201 that includes transformed data 202 and an associated tag 204 containing information associated with the transformed data and the first-tier transforms 200. In some implementations, the transformed data 202 is generally altered or non-altered pieces of the input data 139. In some implementations where pieces of the input data 139 are not altered to produce the transform data 202, the first-tier transforms 200 include generation of signatures to be later used to verify that the input data 139 has been properly reconstructed from the shredded input data 156.

The pre-shred 201 is then sent on to the second-tier component 164 where second-tier transforms 206 are performed on the transformed data 202. The second-tier transforms 206 generally can include the second transformation functions (step 134) and the redundancy generation function (step 135). The second-tier component 164 then outputs a pre-shred 207 that includes transformed data 208 and a tag 210. As shown in FIG. 9, the tag 210 includes first-tier transform information contained by the tag 204 as well as second-tier transform information.

The pre-shred 207 goes on to the third tier component 166 where third tier transforms 212 are performed on the transformed data 208. The third tier transforms 212 generally can include the third transformation functions (step 136). The third tier component 166 then outputs a shred 156 containing transformed data 216 and a tag 218. The tag 218 includes first-tier transform information contained by the tag 204, second-tier transform information contained by the tag 210, as well as third tier transform information as depicted in FIG. 9. The shred 156 is part of a shred group 154 that contains other shreds from other third tier components of the particular shredder 160. The tag 218 also contains information about the transformed data 216 including its relationship to other transformed data of other shreds of the shred group 154 so that the shreds of the shred group can be put back into the proper order during reconstruction of the input data 139. As discussed above the shredder 160 may not have all of the three tiers explicitly shown in FIG. 9, but instead two or three of the tiers may be merged together.

Figure 10:
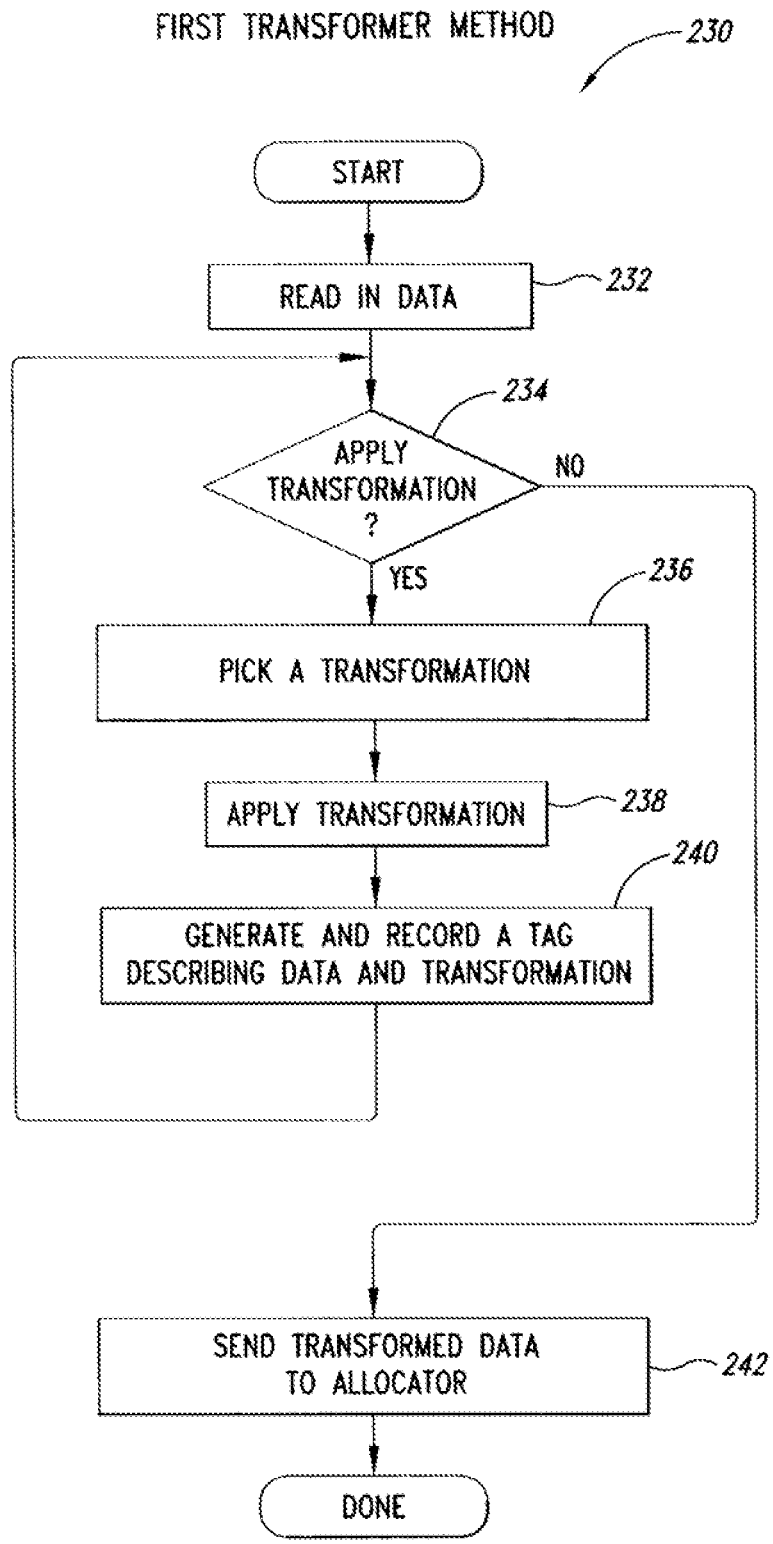
FIG. 10 is a flow chart showing an exemplary first transformer method.

An exemplary first transformer method 230 that the first transformer 174 performs is depicted in FIG. 10 wherein data is obtained (step 232) followed by a determination of whether a transformation needs to be applied to the data. If so (YES branch of decision step 234), the method 230 picks a transformation to be applied to the data (step 236), applies a transformation to the data (step 238), and generates a tag describing the data and the transformation function used on the data. Otherwise (NO branch of decision step 234), the method 230 sends data on to the second-tier component 164 and the method ends.

The types of transformation functions selected by the first transformer method 230 include compression, encryption, and digital signature generation. Compression is generally used when the particular type of data can be compressed to a significant extent. The type of compression selected also depends upon whether loss of some information due to compression contained by the pre-compressed data can be tolerated. For example, some implementations use a lossless compression, such as GZIP or TIFF compression, or other lossless compression functions, which may be good for files or two-dimensional images. Other implementations use a lossy compression, such as JPEG for images, MPEG for video, and MP3 for audio when loss of some information due to the compression can be tolerated.

Implementations of encryption include those that use stream ciphers and those that use block ciphers. Stream ciphers, such as RC4, work somewhat sequentially by encoding data in bits or bytes at a time. Block ciphers, such as the Advanced Encryption Standard (AES), the Data Encryption Standard (DES), and Triple-DES (3DES) code blocks of data at a time such as blocks of 128 bits or 64 bits of data. With some implementations of block ciphers, padding is commonly used to complete blocks of data for encryption that may not have enough data to fill a block recognized by the particular encryption method selected. The shredding and the shredding system and method discussed herein is envisioned to be used with any other encryption method that provides a desired level of security dependent upon such other factors as proper key management.

Implementations using signature generation allows for data integrity checking to verify the validity of reconstruction of the input data 139 from the shredded input data 156 including subsets of the shredded input data that has fewer than the total number of the shreds found in the shredded input data, but enough, due to redundancy inherent with the shreds, to reconstruct the input data. Generally the signatures generated at one or more points during the shredding process are then checked at corresponding one or more points during the deshredding process. In some implementations, the first transformer 174 uses a signature generation function such as SHA-1 to determine later on in a first-tier of the deshredding process described further below whether the original input data 139 has been reproduced through the deshredding process. In other implementations, the third transformers 182 use a signature generation function such as CRC32 to determine later on in a third tier of the deshredding process described further below whether particular one or more blocks of data have been corrupted before proceeding further in the deshredding process to reconstruct the input data 139. Still in other implementations, both the first transformer 174 and the third transformers 182 use signature generation functions. All various types of signature generation functions are envisioned for use with the shredding and deshredding process.

The second transformers 178 could also implement a signature generation function instead of or in addition to implementation by the first transformers 174. The presence of second transformers 178 would indicate that the first-tier component 162 was using the allocator 176 to split up the input data 139 and allocate to multiple processors in parallel or to a single processor sequentially. This allocation would be useful if limited resources were available for a resource intensive signature generation function such as typically used by the first transformer 174. The trade-off may exist in that a signature generated by the second transformers 178 would be used later on in the deshredding process somewhat earlier than a signature generated by the first transformer 174, so that a verification step using the signature generated by the second transformers would not be quite as close to a final check of data integrity than a verification step using a signature generated by the first transformer.

Examples of some signature generation functions include the Secure Hash Algorithms (SHA) (e.g. SHA-1), the UMAC function, the MD5 function, and the HMAC function. These particular examples of signature generation functions typically produce relatively large output, which increases the likelihood of error detection since it is very difficult to change the data without detection of the change. Since the output is rather large these particular examples tend to require a relatively large amount of processing capability. These examples would be particularly useful for the first transformer 174, whose generated signature could be used later in the deshredding process as a final check of data integrity. At this point, if data integrity were found to be lacking, the deshredding process would go back to its initial steps to substitute other shreds. The deshredding process would then go through its other deshredding process steps with these other shreds to come up with another attempt at reconstructing the input data, which would then be checked using the signature generated by the first transformer 174. These types of signature generation functions could also be used by the third transformers 182 as implemented in software due to its current complexity for hardware implementations. Future hardware implementations of these types of signature generation functions may also be used in the third transformers 182 as hardware implementations of complex functions progressively become easier to accomplish.

Other examples of signature generation functions allow for faster generation with smaller resource requirements such as a whole range of CRC functions including 16-bit, 32-bit and 64-bit versions. Use of these functions have an increased risk of undetected errors, but since they are relatively fast they could be effectively used with the third transformers 182 to generate signatures that would then be used in an initial check of data integrity during the deshredding process. During this initial checking process, if one or more shreds were found to be corrupted, other blocks of data could be quickly substituted until enough shreds were found to be uncorrupted to proceed on to further steps of the deshredding process. These types of signature generation functions could be currently implemented in practice either by software or hardware, but hardware would typically have a speed advantage.

Still other examples of signature generation functions would use cryptographic strength encryption functions such as the Digital Signature Standard (DSA) or an RSA type signature. These signature generation functions are relatively slow, but are highly secure. They could be used to verify the authenticity of reconstructed input data to prove who actually created the data. The first transformer 174 or the second transformers 178 would typically perform these kinds of the signature generation functions.

The sequential orders in which transformations are performed by the first transformer 174 and the second transformer 178 have many possible combinations, however, only a certain number of these combinations are allowed. A table of allowed transformation combinations is shown in FIG. 11 with associated advantages described in a table found in FIG. 12. In FIG. 11, "A" represents the allocation function, "C" represents the compression functions, "E" represents the encryption functions, and "S" represents the signature generation functions. The rule column in FIG. 11 identifies a particular transformation combination; the Fpre column identifies particular functions used for each of the transformation combinations and identifies which functions are performed by the first transformer 174 and the second transformer 178. In the Fpre column, the order of performing the functions is from left to right such that for any line in the table, a function having its identifier at the far left of the Fpre column is performed first and any other functions having their identifiers positioned to the right of this first function identifier are performed in sequential order from left to right. For instance for the rule 40 line, the first transformer 174 first performs a compression function, and the first transformer performs the allocation function, then the second transformer 178 performs an encryption function, and then the second transformer performs a signature generation function. Associated advantages for the rule 40 line include advantages 2-7 and 9-10 as described in FIG. 12.

According to FIG. 12, Advantage No. 1 uses a selection criteria of signature generation alone or signature generation before compression, allocation, or encryption. The advantage here is high data integrity because the signature is generated either as a first function or before compression, and allocation, or encryption. Consequently any of the entries in the table of FIG. 11 that had signature generation alone or before compression, allocation, or encryption would be a candidate for high data integrity.

Advantage No. 2 uses a selection criteria of allocation generation, which allows for high-performance. Advantage No. 3 uses a selection criteria of compression without encryption before compression, which provides efficiency in storage of data. If encryption is done before compression, compression is very difficult or impossible. Consequently, any of the entries in the table of FIG. 11 that only had compression or did compression before encryption would be a candidate for a space efficiency advantage.

Advantage No. 4 uses a selection criteria of allocation before encryption, which increases data security. The allocation before encryption means that there is a possibility of transmitting unencrypted data over a network before it is encrypted so that this advantage does not rate as a high data security advantage. If the tiered components of the shredder 160 were implemented such that data was sent over a local bus rather than a network before encryption occurred in data security of transformation combinations related to Advantage No. 4 would be relatively high. Advantage No. 5 uses a selection criteria of compression before allocation, which provides a benefit of a relative reduction of processing time. If data is compressed before it is allocated and sent to multiple processors, there is generally less data to send so that the processors can receive the data more quickly and have relatively less data to process.

Advantage No. 6 uses a selection criteria of signature generation after allocation, compression, or encryption, which provides enhanced data integrity. This type of signature generation offers relatively less data integrity than other approaches to signature generation because a bug, logical error, or other cause of data corruption could occur before the signature generation is performed. Advantage No. 7 uses a selection criteria of encryption, which provides data security. If data is not sent over a network before encryption occurs, then data security is relatively high.

Advantage No. 8 uses a selection criteria of encryption or encryption before allocation if allocation is used which offers relatively high data security since if data is transmitted across a network during an allocation process, the transmitted data is encrypted. Advantage No. 9 uses a selection criteria of allocation before encryption, which provides relatively high-performance and data security. If data were sent over a network immediately after allocation, then data security would not be as high as if it were sent over a local bus immediately after allocation since encryption occurs after allocation for Advantage No. 9.

Advantage No. 10 uses a selection criteria of allocation before signature generation, which offers high-performance and data integrity. Since allocation is before signature generation, data integrity is not as relatively high as some other transformation combinations. An example of this would be where signature generation occurs with the second transformers 178 or the third transformers 182. Advantage No. 11 uses a selection criteria of allocation before compression, which offers high-performance and data integrity with an emphasis on high-performance. By performing allocation before compression it is possible for a set of multiple processors to perform compression in parallel.

Advantage No. 12 uses a selection criteria of signature generation before allocation, which provides relatively high data integrity. During the deshredding process, the signature is then checked quite near the final step of outputting the input data 139 recovered by the deshredding process. The entry in the table of FIG. 12 label Advantage No. 13 is actually a disadvantage so that the selection criteria of encryption before compression is indicated in the table as not to be used because compression is not possible if encryption precedes a compression attempt. This disadvantage of No. 13 was used to rule out many of the possible transformation combinations as disallowed.

Figure 13:
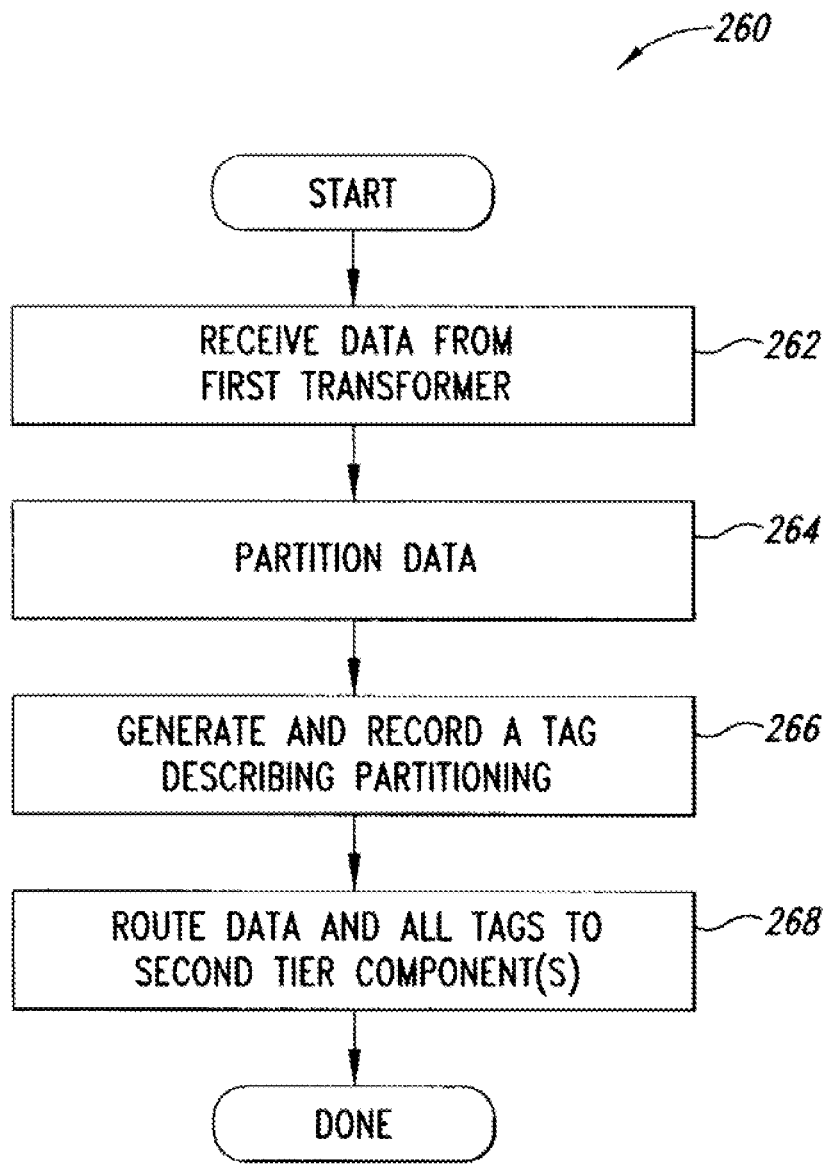
FIG. 13 is a flowchart showing an exemplary allocator method.

Allocation by the allocator 176 allows for processes subsequent to the allocation to be carried out in parallel by multiple processors or sequentially by a single processor with limited resources. An exemplary allocator method 260 is shown in FIG. 13 as receiving data from the first transformer 174 (step 262) and partitioning the received data (step 264) to be sent to either multiple processors to process the partitioned data in parallel or to a single processor with limited resources to process the partitioned data sequentially.

Different types of partitioning can be used by the allocator 176 including chunking, interleaving, and hybrid combinations of these two types. Chunking is suitable for software implementations of the allocator 176 because the allocator takes relatively large blocks of data at a time and sends each of the blocks to one of the second-tier components 164. Interleaving is suitable for dedicated hardware because the allocator 176 routes different pieces of data separately to different second-tier components 164 in a round-robin fashion. A hybrid combination between chunking and interleaving is one form of a general remapping of inputs and outputs of the allocator 176.

In general, the allocator 176 allocates data to one or more of the processors, so that the general scheme of remapping is not limited and specific remapping is dependent upon particular situations. The allocator method 260 then generates and appends tags to the partitioned data (step 266) and then routes the partitioned data and tags to various one or more second-tier components 164 and ends.

Figure 14:
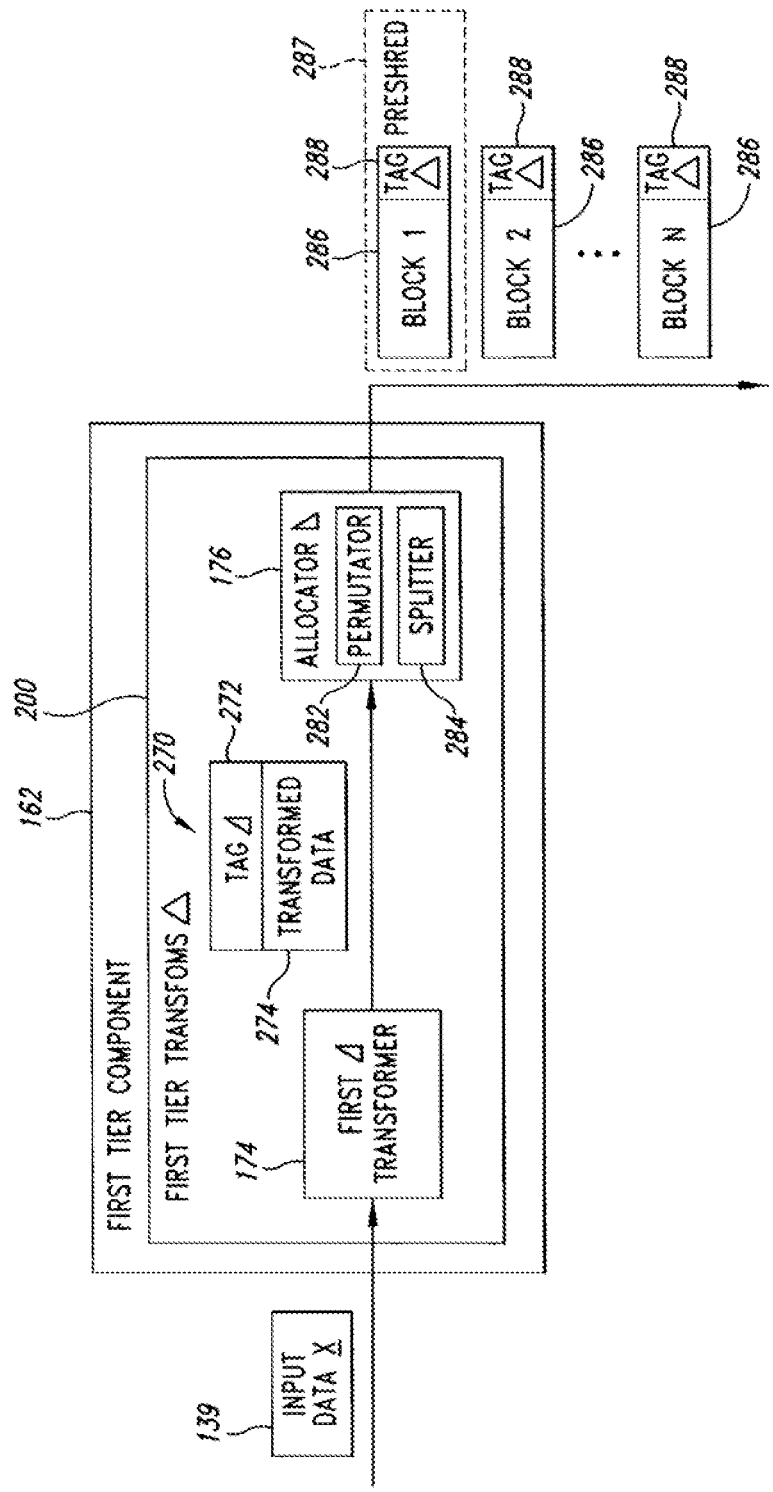
FIG. 14 is a schematic showing an exemplary allocator transformation and tagging.

FIG. 14 provides an exemplary depiction of the first-tier component 162 processing the input data 139 through first-tier transforms 200. The first transformer 174 processes the input data 139 and outputs a pre-shred 270 containing a tag 272 describing the first transformer processing and transformed data 274 resulting from the first transformer processing. The pre-shred 270 is sent to the allocator 176, which contains a permutator 282 and splitter 284. The permutator 282 first re-maps the ordering of the transformed data 274 using various partitioning methods discussed above such as chunking or interleaving. The splitter 284 then splits the re-mapped data into data blocks 286 that are part of pre-shreds 287 outputted by the first-tier component 162.

If the transformed data 274 is not a sufficient quantity to split cleanly between a predetermined number of the second-tier components 164, and some implementations the splitter 284 will pad the data outputted by the permutator 282 with, for example, zeros or other assigned number. The allocator 176 also generates information describing its processing and appends this affirmation along with the information contained in the tag 272 to generate tags 288. The allocator 176 appends the tags 288 with the data blocks 286 to generate the pre-shreds 287 that it outputs. The tags 288 also include identification information so that the blocks 287 can be properly ordered during the deshredding process.

Figure 15:
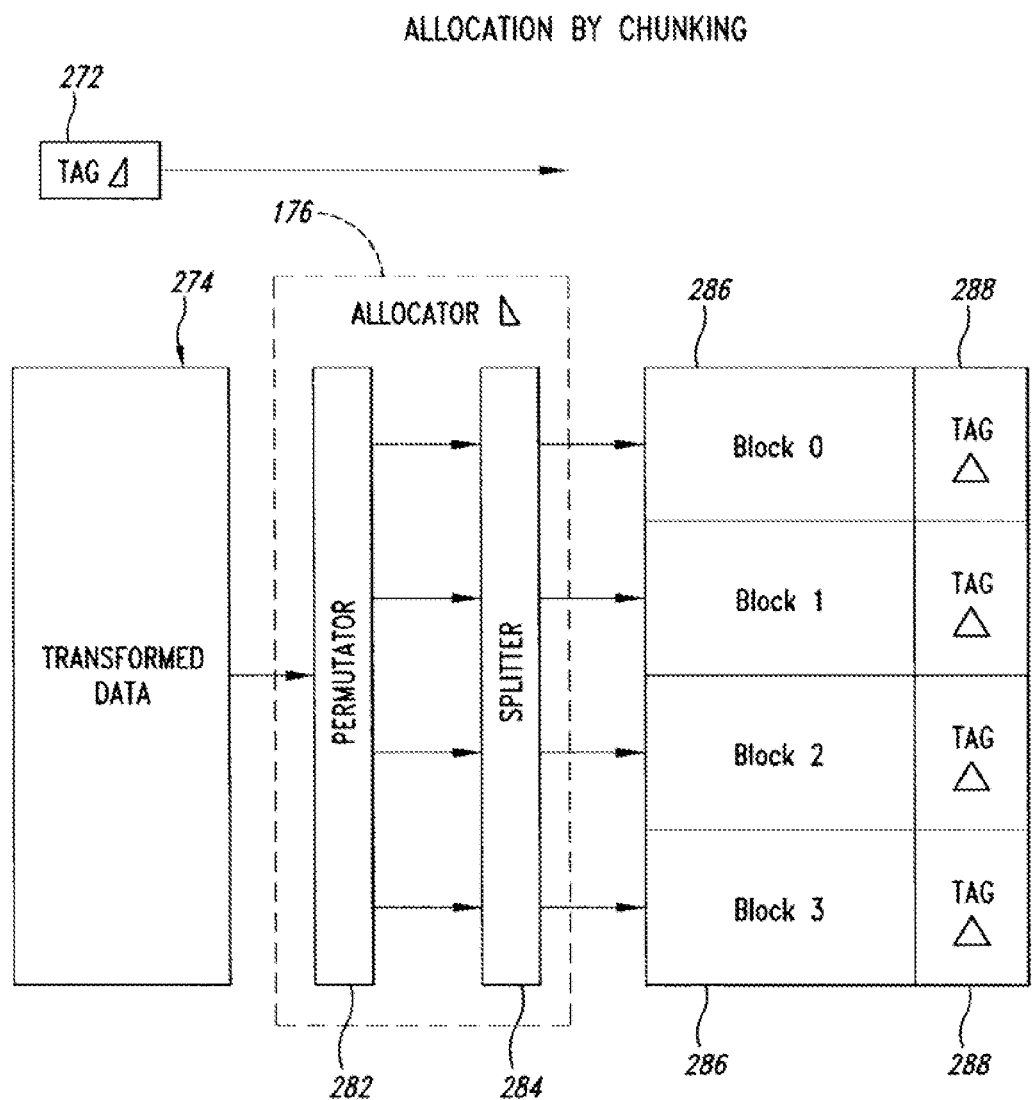
FIG. 15 is a schematic showing an exemplary allocation by chunking.

An exemplary depiction of chunking by the allocator 176 is shown in FIG. 15 in which the permutator 282 uses a pass-through re-map, which sequentially grabs blocks of data and passes the sequential blocks of data through the permutator without altering the order of the data. Although this sequential distributing of blocks of data could be implemented in hardware, for certain situations, it may be more suitable for implementation by software because current software is good at moving blocks of data around. The splitter 284 then splits the sequential blocks of data into the data blocks 286, which in this case becomes blocks 0-3, and appends tags 288 to the data blocks. If the transformed data 274 was not easily divisible into the number of desired blocks, in some implementations the splitter 284 would pad the output of the permutator 282 with dummy placeholder data.

Figure 16:
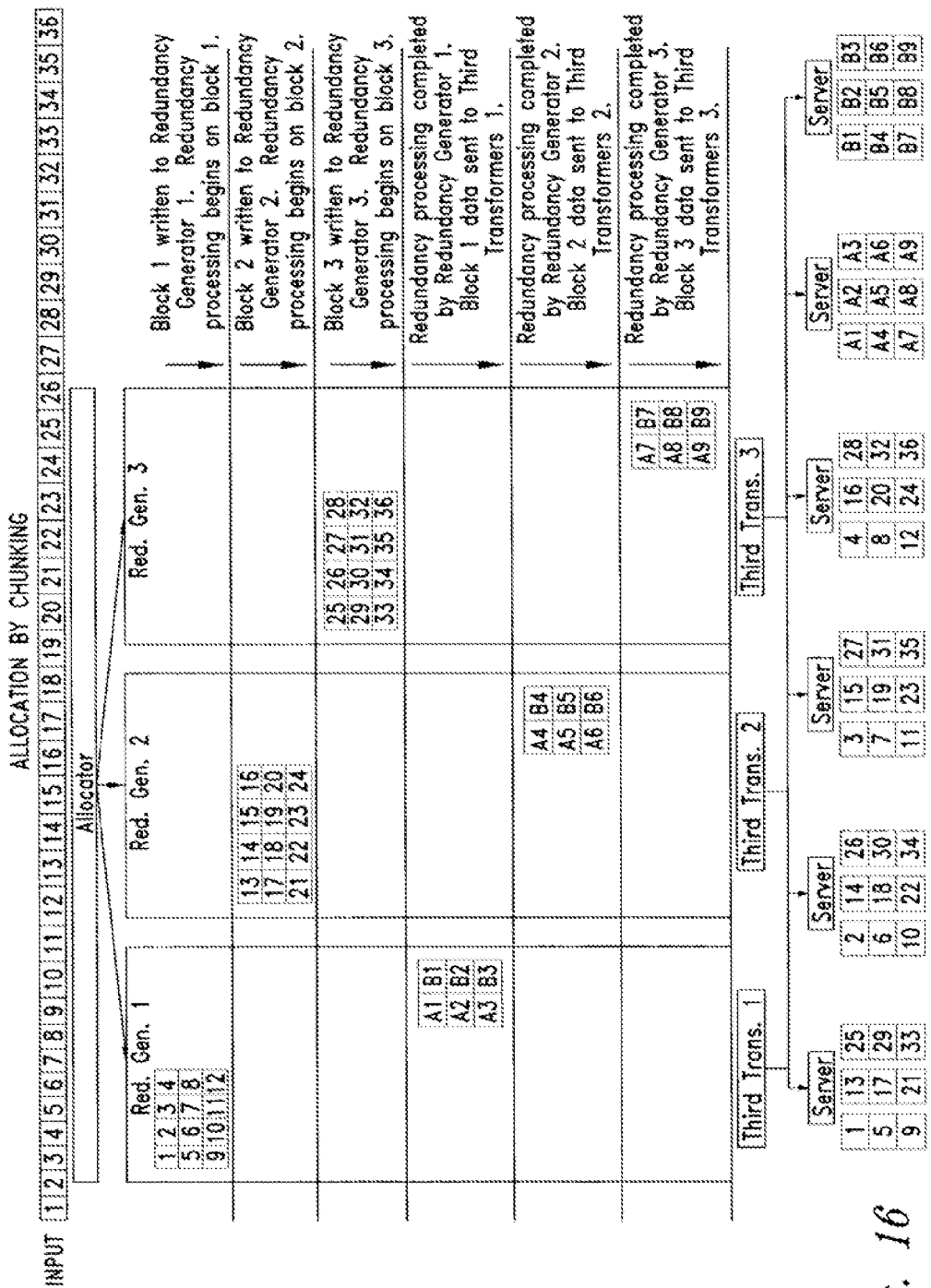
FIG. 16 is a schematic showing further detail regarding the exemplary allocation by chunking.

An exemplary dataflow representation of allocation by chunking found in FIG. 16 shows how the input data 139 would be partitioned by the allocator 176 and then sent through the second-tier components 164 and the third tier components 166 to be finally stored on servers. In this example, the allocator 176 sequentially sends three pre-shreds 287 to three separate second-tier components 164. The redundancy generator 180 of each of the second-tier components 164 then generates redundant data and sends its received pre-shred 287 and its redundancy generated data to be received by one of the third tier components 166. The third tier components 166 then finally split up and send data out to various servers to be stored as shown in detail in FIG. 16.

For instance, the first column of inputs of Redundancy Generator 1 gets sent to the first server, the second column of inputs gets sent to the second server and so on through the fourth column of inputs and the fourth server. The columns of redundant data of Redundancy Generator 1 get sent to the fifth and sixth servers.

Figure 17:
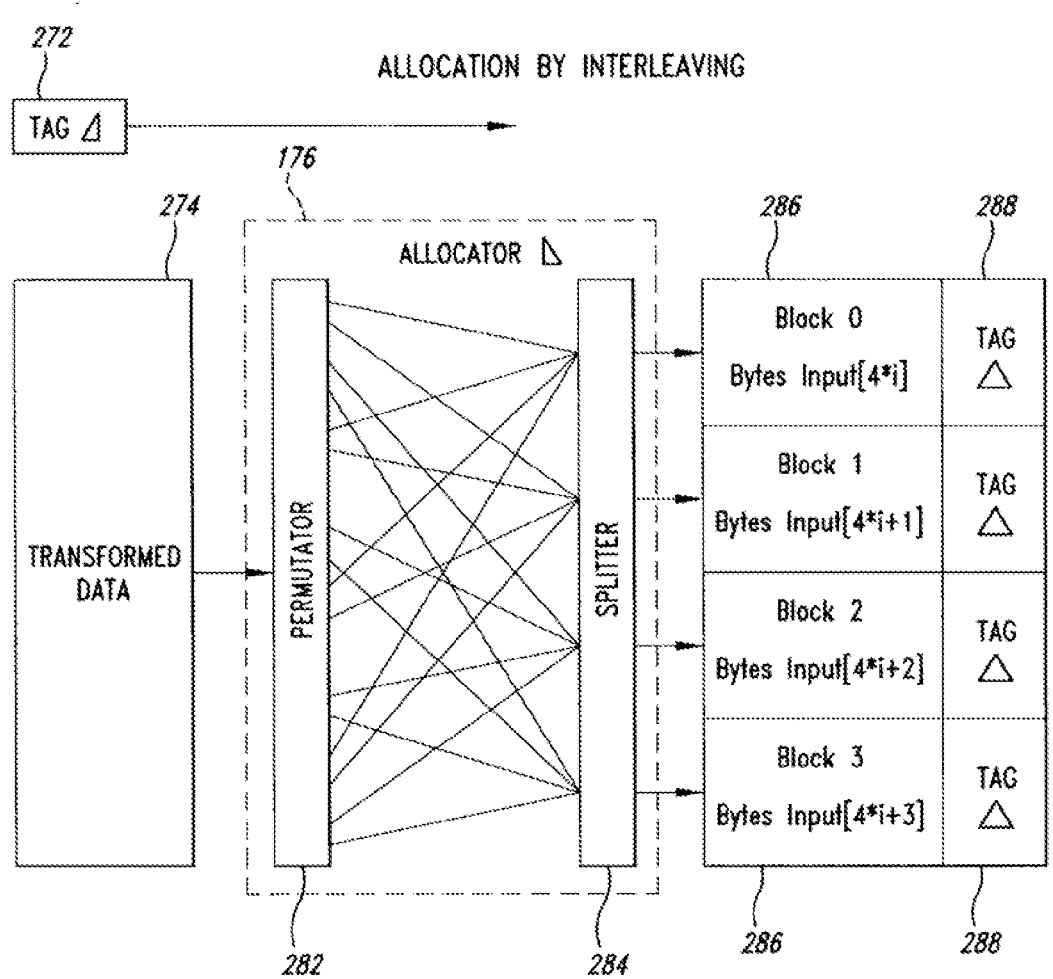
FIG. 17 is schematic showing an exemplary allocation by interleaving.

An exemplary depiction of interleaving by the allocator 176 is shown in FIG. 17 in which the permutator 282 uses an interleaving re-map, which in some implementations is round-robin distributing of the data at the bit or byte level into blocks of data and passes the distributed blocks of data through the permutator on to the splitter 284. In the case shown in FIG. 17 four blocks are being generated and every fourth byte becomes input for the first block 0 and so on for the other blocks of data being generated. This type of interleaving is suitable for a hardware implementation since hardware is very fast and can handle relatively small pieces of data that are being reorganized at any one time. Interleaving can inherently speed up processing in certain circumstances, with relatively less latency, since there is less waiting for relatively small pieces of data to load and be available to be processed. With chunking, a whole block of data is needed before the chunking process can allocate a block for further processing, whereas with interleaving, processing can begin once there is enough data to begin a redundancy function, which may be much smaller than a block of data. In summary, with interleaving there are two practical speed advantages in that interleaving is conducive for being implemented in hardware and interleaving also has relatively low latency. The splitter 284 then splits the distributed blocks of data into the data blocks 286, which in this case becomes blocks 0-3, and appends tags 288 to the data blocks. If the transformed data 274 was not easily divisible into the number of desired blocks, in some implementations the splitter 284 would pad the output of the permutator 282 with dummy placeholder data.

Figure 18:
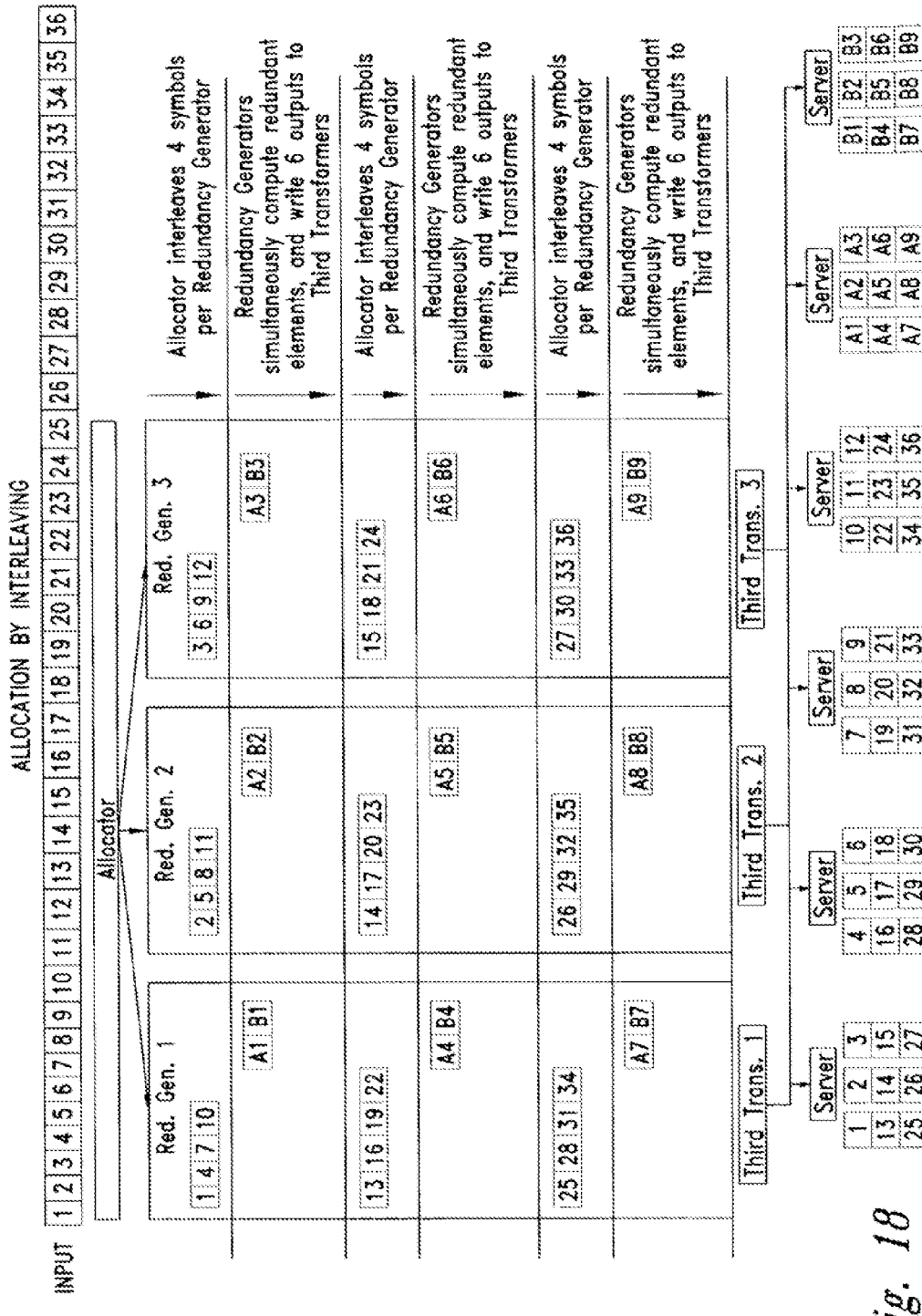
FIG. 18 is a schematic showing further detail regarding the exemplary allocation by interleaving.

An exemplary dataflow representation of allocation by interleaving found in FIG. 18 shows how the input data 139 would be partitioned by the allocator 176 and then sent through the second-tier components 164 and the third tier components 166 to be finally stored on servers. This dataflow shows that Redundancy Generator 1 shown in FIG. 18 begins processing after it has four inputs because the allocator 176 under interleaving does not need to send out an entire block at a time to the redundancy generators whereas in the case of allocation by chunking, an equivalent Redundancy Generator 1, shown in FIG. 16, begins processing after it has twelve inputs, constituting a block of data in these examples, since the allocator sends the data to the redundancy generators a data block at a time. Once the Redundancy Generator 1 in FIG. 18 receives the first four inputs, it processes them and sends them along with two redundant data pieces to the Third Transformer 1, which processes the data pieces and then distributes the processed six data pieces amongst the six servers shown. The end result is that there can be much less latency for the case of allocation by interleaving compared with allocation by chunking since processing of data starts sooner with interleaving and there is a much more staggered style of processing as well compared with a more batch mode of processing for allocation by chunking.

Although allocation by chunking and allocation by interleaving has been shown in detail, this does not imply that these are the only methods for allocation. As described above there are many varied ways to allocate data including hybrid combinations of chunking and interleaving and other re-mapping methods. For example during allocation, certain particular bytes or other groupings of data may be rearranged based upon particular processing to occur in subsequent steps or for certain portions of the data to be secretly mapped to certain storage units for reasons such as enhanced security for example.

Figure 19:
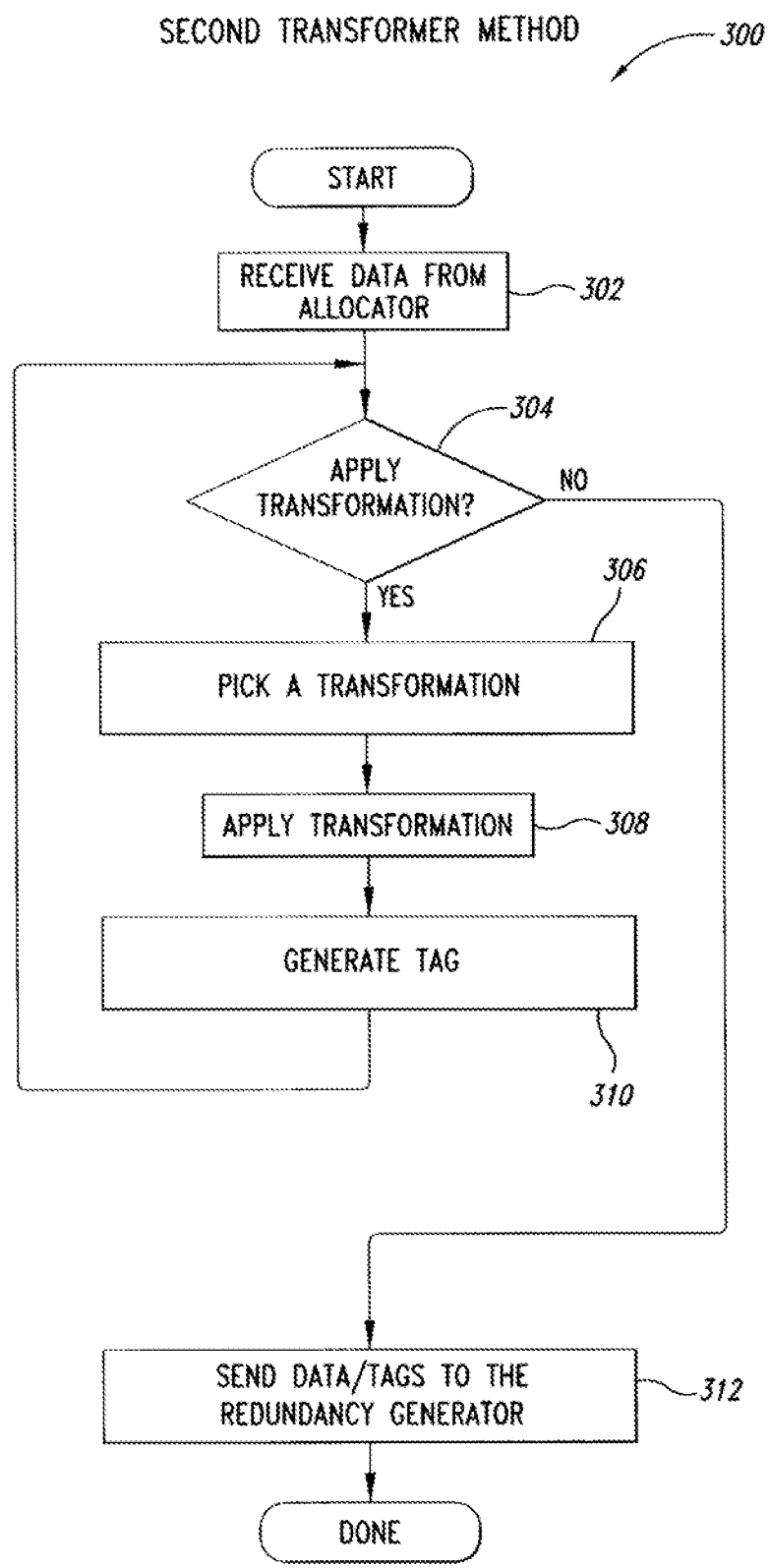
FIG. 19 is a flowchart showing an exemplary second transformer method.

The second transformer 178 behaves in a similar manner as the first transformer 174 except that when the second transformer is finished applying transformations, it sends its data and tags to the redundancy generator 180 as shown in FIG. 19.

A general purpose for the redundancy generator 180 is to make the shredded input data 106 fault-tolerant. The end result of the redundancy generator is to generate data redundant to the input data 139 so that some of the shredded input data 106 that is stored in storage pool 148 could be lost without preventing the input data from being recovered. Implementations of the redundancy generator 180 use many various types of redundancy transformations. Some of the redundancy transformations are very high-performance including XOR codes including X-Code, and other similar codes, which allow for high-speed processing. Other redundancy transformations are used for efficient storage such as the Maximum Distance Separable (MDS) codes, which include the Reed Solomon family of codes and other codes, which allow for space efficiency but are typically slower in processing and may require software implementation based upon complexity.

Other considerations for redundancy generation include use of padding for particular redundancy transforms that require certain sized units of data. On the other hand, if the size of data is much larger than what the redundancy transforms can handle, the data may have to be broken up and the redundancy transform repeated numerous times in order to fully process all the data.

A redundancy transformation called Copy-N can be used by some implementations to simply make multiple exact copies of existing data. Copy-N is an example of an encoding that generates a larger quantity redundant data than would be needed to reconstruct stored data given a designated level of data loss. Other redundancy transformations used by implementations of the redundancy generator 180 also generate larger quantities of redundant data than are needed to reconstruct a stored data given a designated level of data loss. A disadvantage of these redundancy transformations that generate more than enough redundant data is that they do not promote efficient storage. Tornado coding is another type of redundancy transformation that has a very linear encoding time to make the transformation relatively fast to perform and able to handle large data file sizes. Tornado coding may, however, be slower than a redundancy transformation such as Reed Solomon for small data sizes and small levels of redundancy. A Product Code is another type a redundancy transformation in which more than one redundancy transformation is combined to address tailored redundancy-performance requirements. N Dimensional parity is another type of redundancy transformation that uses a matrix model of rows and columns to generate redundant elements. The system and method for shredding and deshredding is not limited to a certain collection of redundancy transformations.

Erasure correcting coding and error correcting coding are also used in implementations. Erasure correcting coding can correct data loss, but cannot find sources of corrupted data. Consequently, if erasure-correcting coding was used, it would be helpful to have the third transformers 182 perform a signature generation function to identify corrupt blocks of data. Error-correcting coding can detect and correct errors, so is more versatile, but generally not as many errors can be corrected overall.

Figure 20:
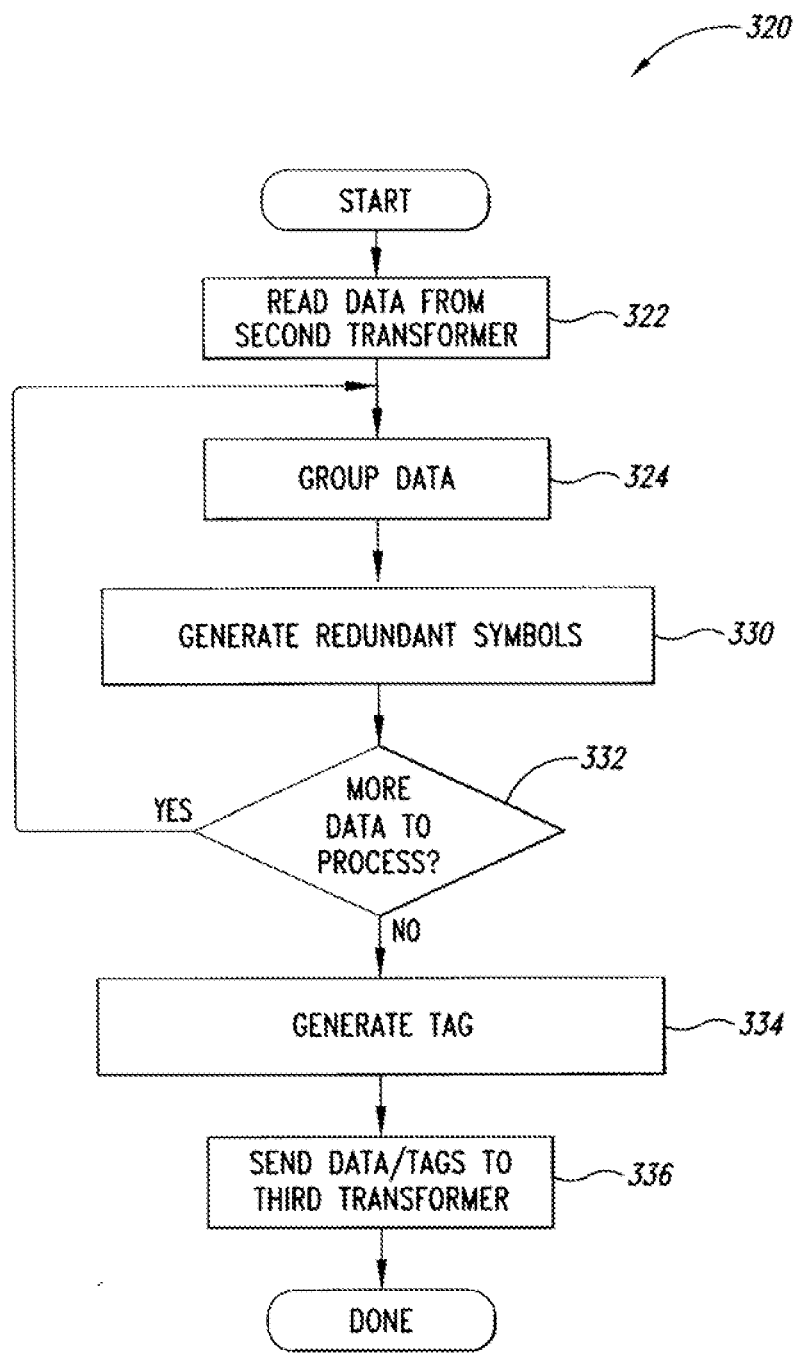
FIG. 20 is a flowchart showing an exemplary redundancy generator method.

An exemplary redundancy generator method 320, shown in FIG. 20, reads data from the second transformer 178 (step 322), groups the read data (step 324), and generates redundant symbols (step 330). If more data is to be processed (YES branch of decision step 332), the method 320 returns to step 324. Otherwise (NO branch of decision step 332), the method 320 generates redundant data (step 324) and sends read data and redundant data to the third transformers 182 (step 336) and ends.

In implementing the redundancy transformations discussed above, the redundancy generator 180 generally uses an overall approach to encoding that may involve systematic encoding, non-systematic encoding, or a hybrid combination of the two encoding schemes. Systematic encoding is typically faster to perform than non-systematic encoding and at present is more versatile as to the types of hardware and software that can be used for implementation whereas non-systematic encoding typically is more suited for a hardware implementation.

Figure 21:
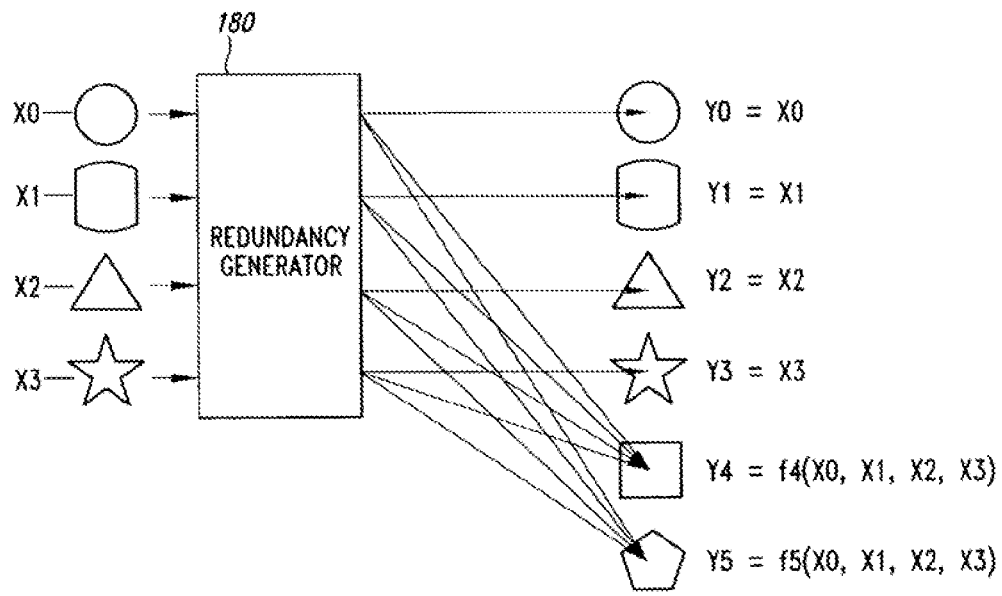
FIG. 21 is a schematic showing an exemplary systematic encoding for a redundancy generator.
Figure 22:
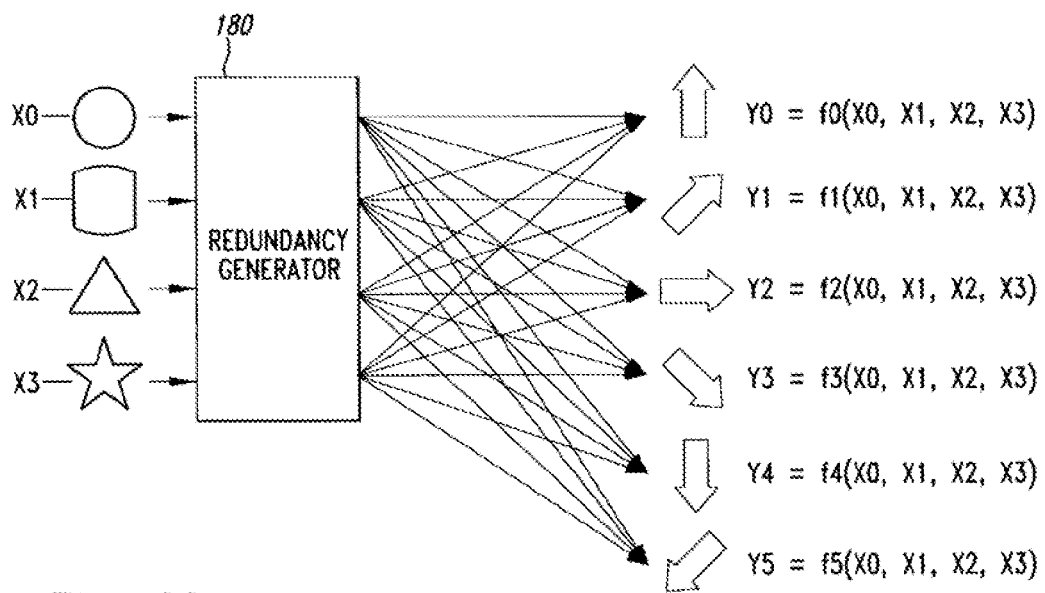
FIG. 22 is a schematic showing an exemplary non-systematic encoding for a redundancy generator.

An example of systematic encoding is shown in FIG. 21 where the redundancy generator 180 receives four inputs of data and passes through the four inputs of received data to the output of the redundancy generator. The redundancy generator 180 also generates two outputs of redundant data from the received data and outputs the two outputs of redundant data along with the four outputs of the received data. An example of non-systematic encoding is shown in FIG. 22 where the redundancy generator 180 generates six outputs of redundancy-generated data from four inputs of received data. Since generation of redundant data is time-consuming, the non-systematic encoding is typically slower than the systematic encoding. A hybrid combination of systematic encoding and non-systematic encoding typically results in having some direct outputs of received data typically fewer in number than what a pure systematic encoding would produce and the rest of the outputs being redundancy generated data typically greater in number of than what a pure systematic encoding would produce.

Figure 23:
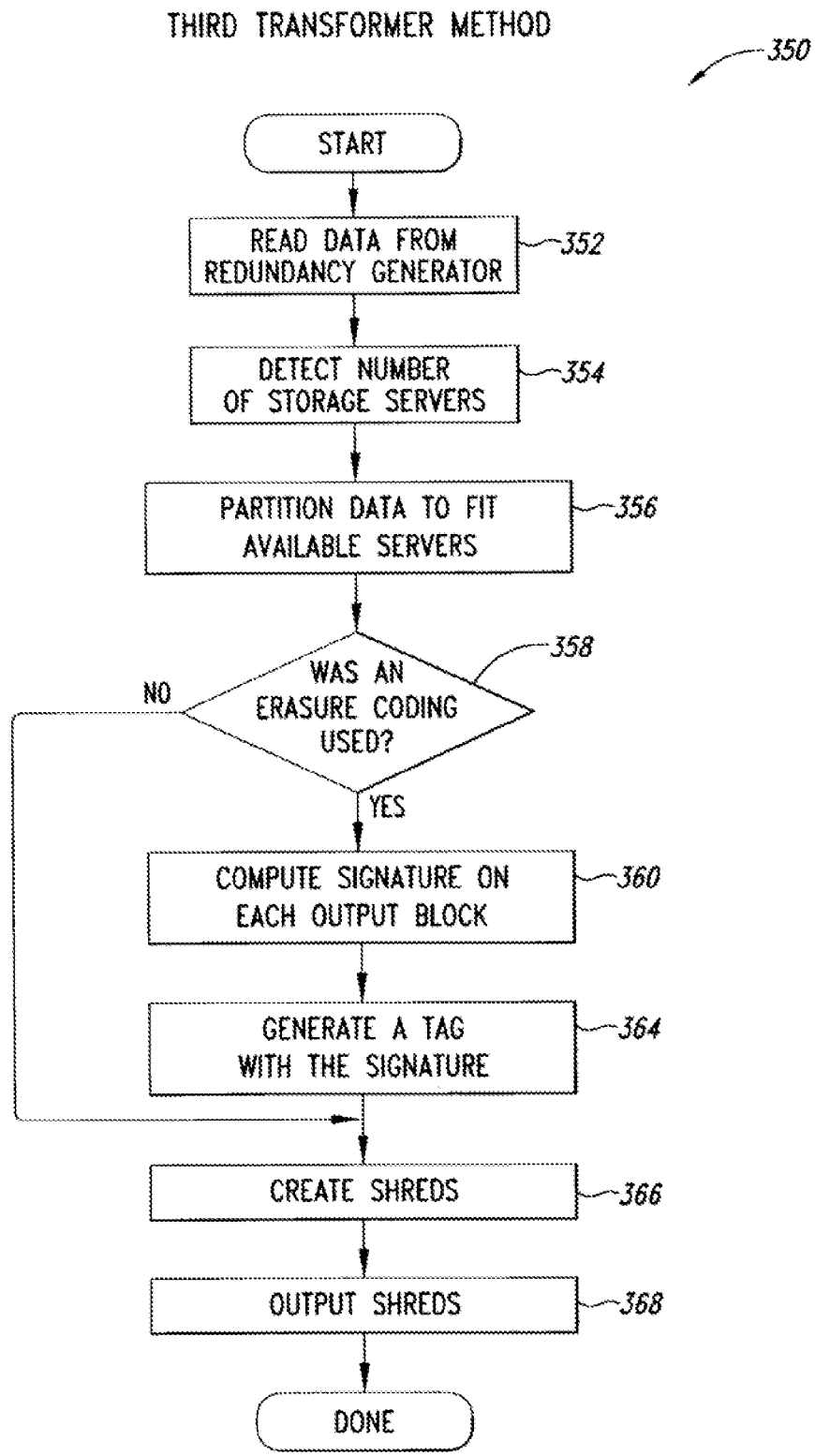
FIG. 23 is a flowchart showing an exemplary third transformer method.

Although the third transformers 182 can be used for encryption and compression functions, the third transformers are typically used for signature generation and partitioning functions. With partitioning, the third transformers 182 reparation data so that it can be conveniently stored given capacities and quantities of available storage units 150. An exemplary third transformer method 350, shown in FIG. 23, reads data from the redundancy generator 180 (step 352), collects information regarding quantities and capacities of available storage units 150 (step 354), and partitions the data read from the redundancy generator into output blocks according to the collected information (step 356). If erasure coding has been used (YES branch of decision step 358), signatures are computed on each output block of the redundancy transformation performed by the redundancy generator 180 (step 360) since typically it would be desirable to have some way of detecting corrupted data with the inability of erasure coding to do such. An example of this situation would be when a Reed Solomon error correcting code may have been used in an erasure-correcting mode.

A tag is then generated with each signature describing associated partitioning and any transformation functions used and is appended to previously generated tags (step 364) before the third transformer method 350 goes on to step 366. Otherwise (NO branch of decision step 358), the third transformer method branches to create shreds 156, which includes generating a final tag, such as the tag 218 that incorporates information from previously generated tags (step 366) and outputs the shreds to the storage units 150 of the storage pool 148.

Figure 24:
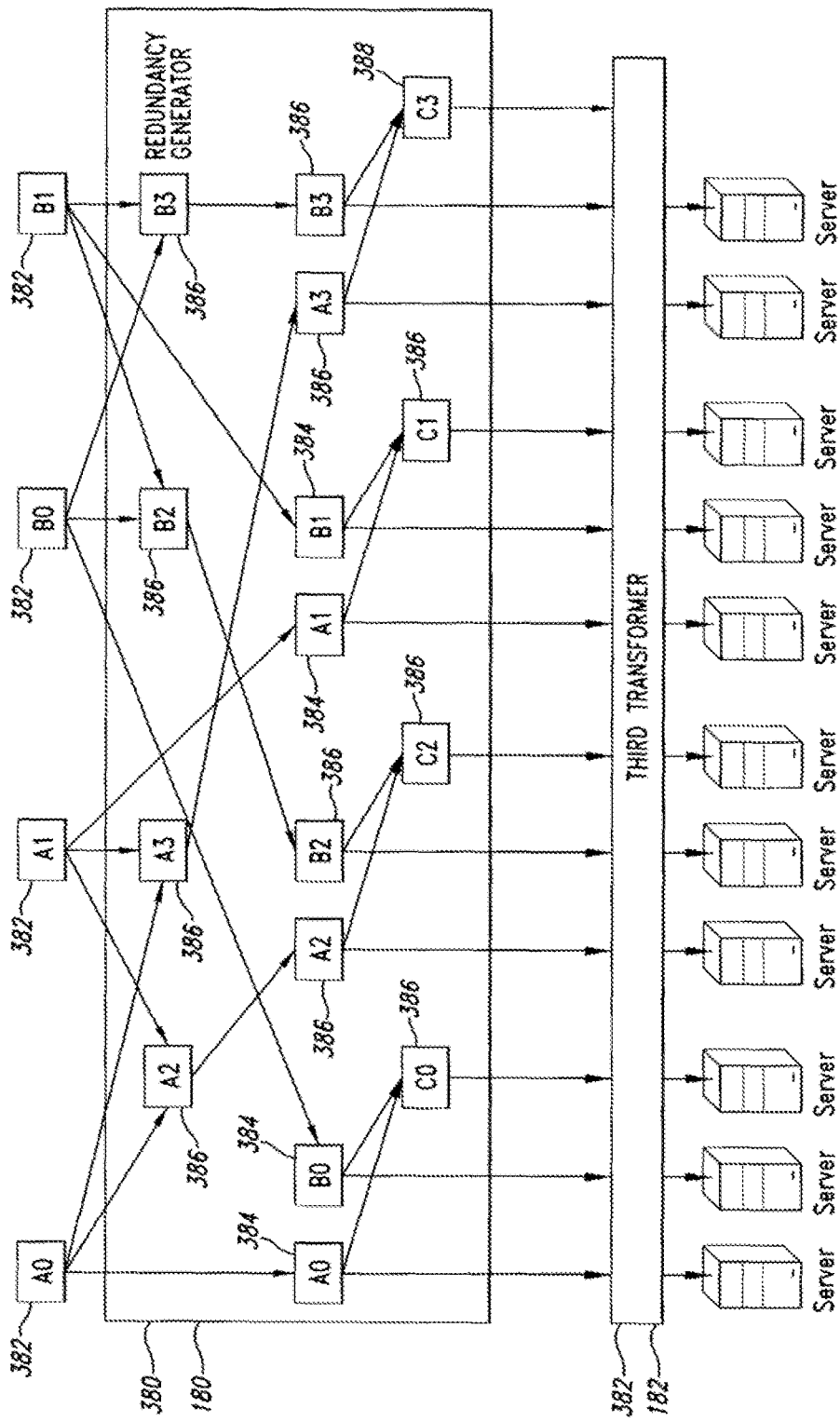
FIG. 24 is a schematic showing an exemplary partitioning of redundancy generator outputs by the third transformer.

An exemplary partitioning of redundancy generator outputs by the third transformers 182 is shown in FIG. 24. A redundancy generator 380 receives inputs 382 to pass-through as pass-through outputs 384 and to generate outputs as generated outputs 386 and 388. In this example, there are 12 outputs from the redundancy generator 380 and 11 servers on a network available for data storage. The third transformer 382 passes all of the 12 outputs of the redundancy generator 380 to the 11 servers except for discarding the C3 generated output 388. The C3 generated output 388 was discarded since it was generated from all of the redundancy generator inputs 382, so that during deshredding, computation associated with the C3 generated output 388 would typically be more than computation associated with the pass-through outputs 384. Although the C3 generated output 388 was shown to be discarded in the particular example of FIG. 24, any of the other generated outputs 386 or any of the pass-through outputs 384 could be discarded as well.

Figure 25:
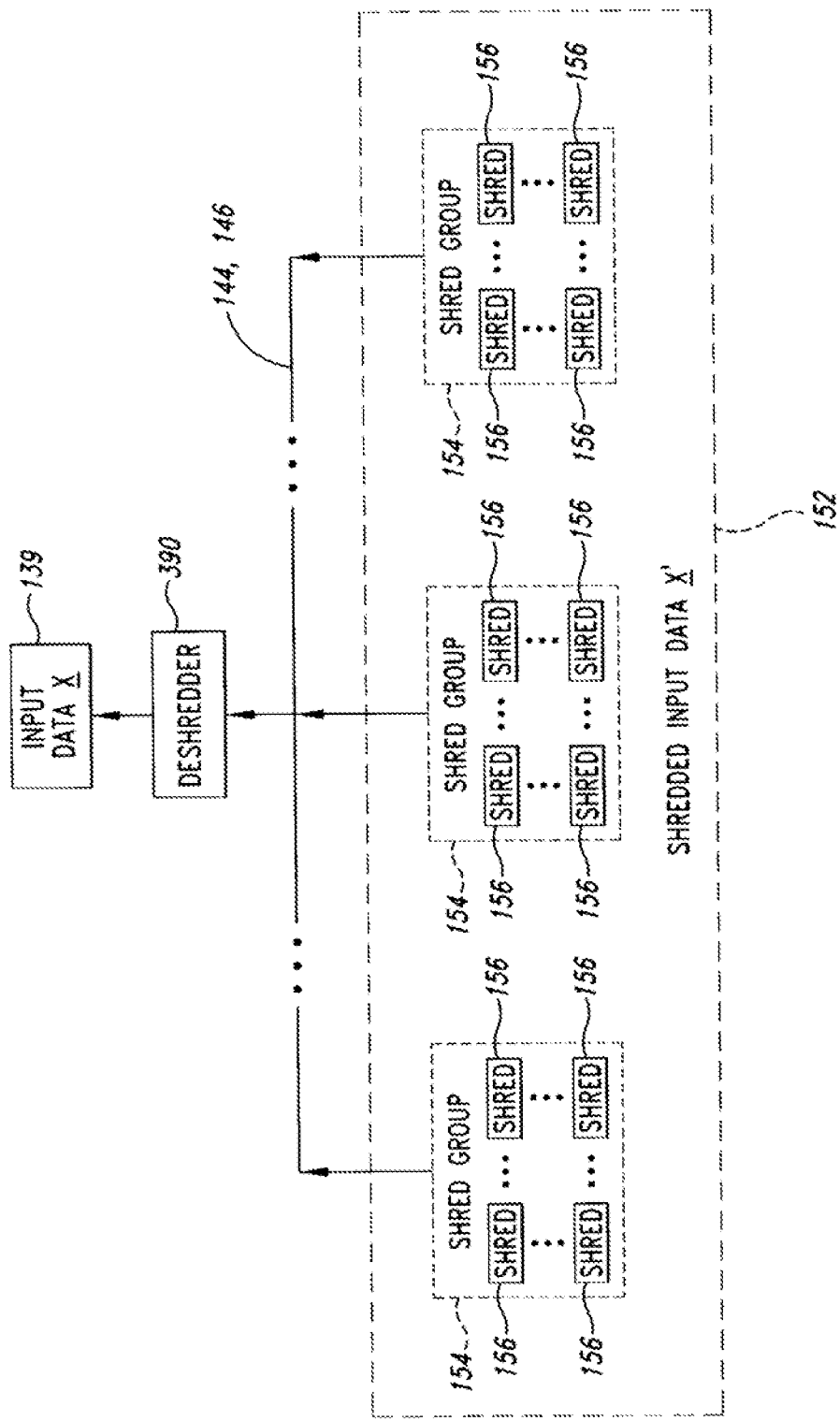
FIG. 25 is a schematic showing an exemplary shred group flow to a deshredder.

A deshredder 390, shown in FIG. 25, receives the shredded input data 152 in the form of the shreds 156 grouped in the shred groups 154 over the interconnect 144 or the interconnect 146. The deshredder 390 processes the received shreds 156 to output a recovered version of the input data 139, which is the same as the original input data. During processing the deshredder performs such functions as signature verification to check data integrity and performs functions inverse to those functions performed by the shredder 160.

Figure 26:
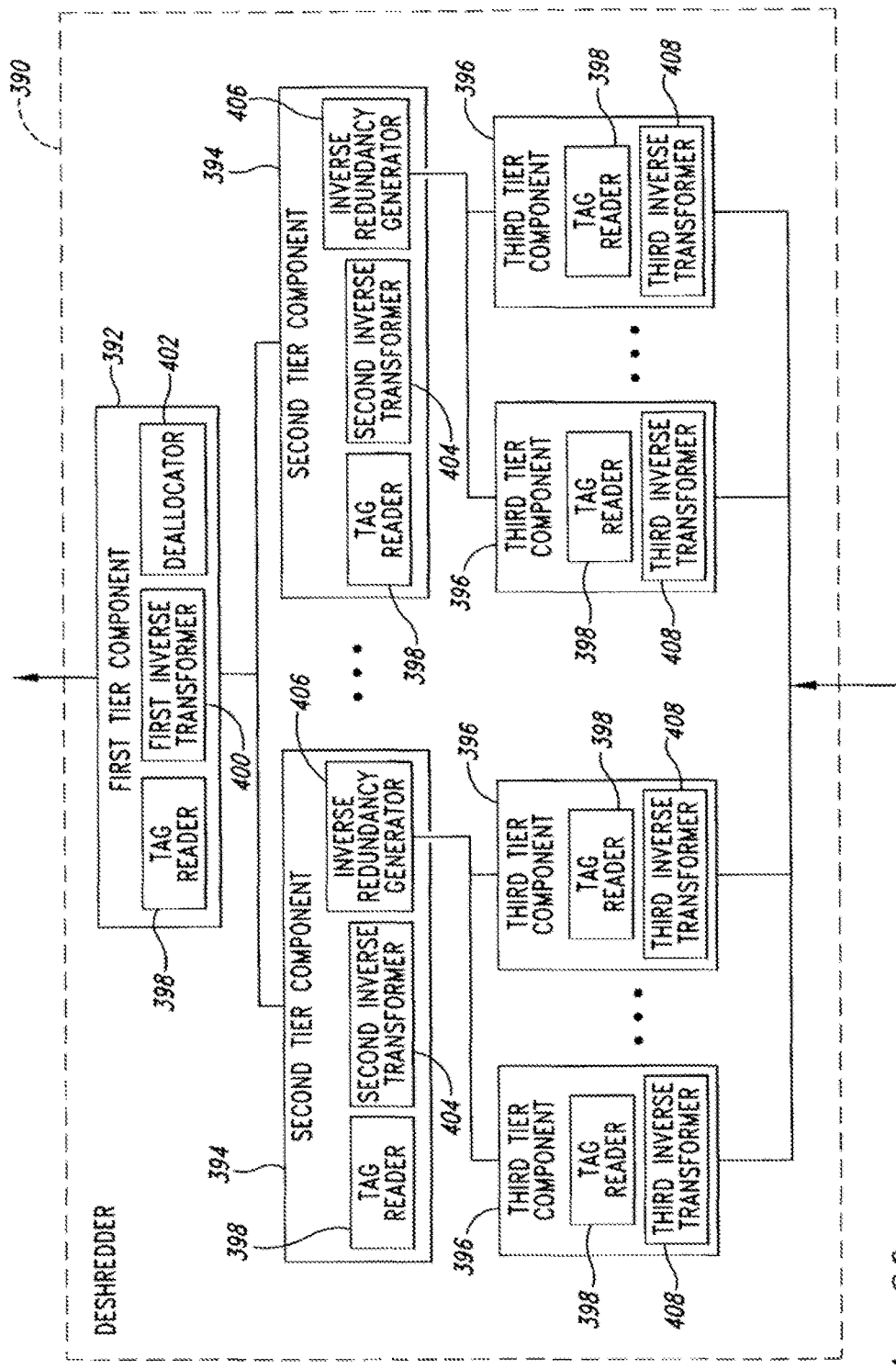
FIG. 26 is a schematic showing detail of an exemplary deshredder.

A deshredder 390, shown in FIG. 26, contains a first-tier component 392, second-tier components 394, and third-tier components 396, which generally reverses the operations performed respectively by the first-tier component 162, the second-tier components 164, and the third-tier components 166 of the shredder 160. The operations of the deshredder 390 are performed first by the third-tier components 396, followed by the second-tier components 394, and then by the first-tier component 392.

The first-tier component 392 includes one of a plurality of tag readers 398, first inverse transformers 400, and the de-allocator 402. Each of the second-tier components 394 includes one of the tag readers 398, second inverse transformers 404, and an inverse redundancy generator 406. Each of the third tier components 396 includes one of the tag readers 398, and third inverse transformers 408. Each of the tag readers 398 gets information from received tags to determine for the inverse transformer of the particular tiered component containing the particular tag reader what inverse transformations should be performed by the inverse transformer on shredded data at a point in the deshredding process associated with the particular tiered component. For instance, if compression, encryption, or signature generation was done by a particular transformer of the shredder 160, then decompression, decryption, or signature verification would be performed by the inverse transformer of the deshredder 390 corresponding to the particular transformer of the shredder.

Figure 27:
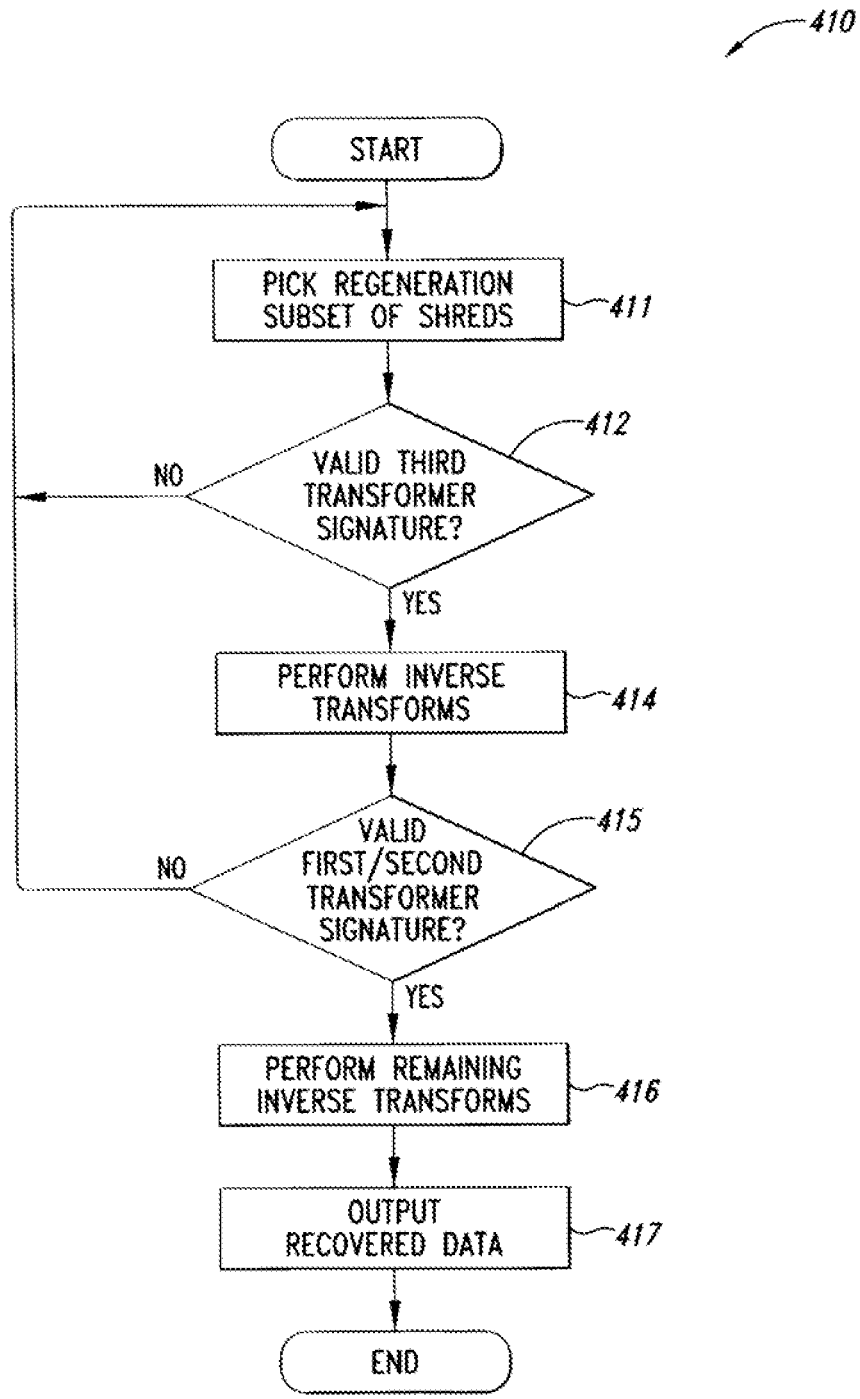
FIG. 27 is a flowchart showing an exemplary method of deshredding using signature verification.

If the first-tier component 162 or the second-tier components 164 of the shredder 160 performed signature generation during the shredding process and the third-tier components 166 also performed signature generation during the shredding process, then the deshredder 390 performs a deshredding method using multi-level signature verification 410 shown in FIG. 27. The deshredder obtains a regeneration subset of shreds 156 (step 411) being enough shreds 156 from the shredded input data 152 to be able to reconstruct the input data 139 if none of the obtained shreds were corrupt.

The third inverse transformers 408 then perform a verification function on the signatures generated by the third-tier components 166. If the third-tier signatures are not valid (NO branch of decision step 412), then the deshredder 390 goes back to step 411. Otherwise (YES branch of decision step 412), the third inverse transformers 408 perform inverse transforms to undo transforms performed by the third-tier components 166 during the shredding process.

Intermediate inverse transforms may then be performed (step 414) by the second-tier components 394 and/or the first-tier components 392 before the deshredder determines whether signatures generated either by the first-tier component 162 or the second-tier components 164 of the shredder 160 are valid and if not (NO branch of decision step 415) goes back to step 411. Otherwise (YES branch of decision step 415) the first inverse transformers 400 and the second inverse transformers 404 perform any remaining inverse transforms to undo any remaining effects resulting from transforms performed by the first-tier components 162 and the second-tier components 164 during the shredding process (step 416). The deshredder 390 then outputs recovered input data 139 (step 417).

Figure 28:
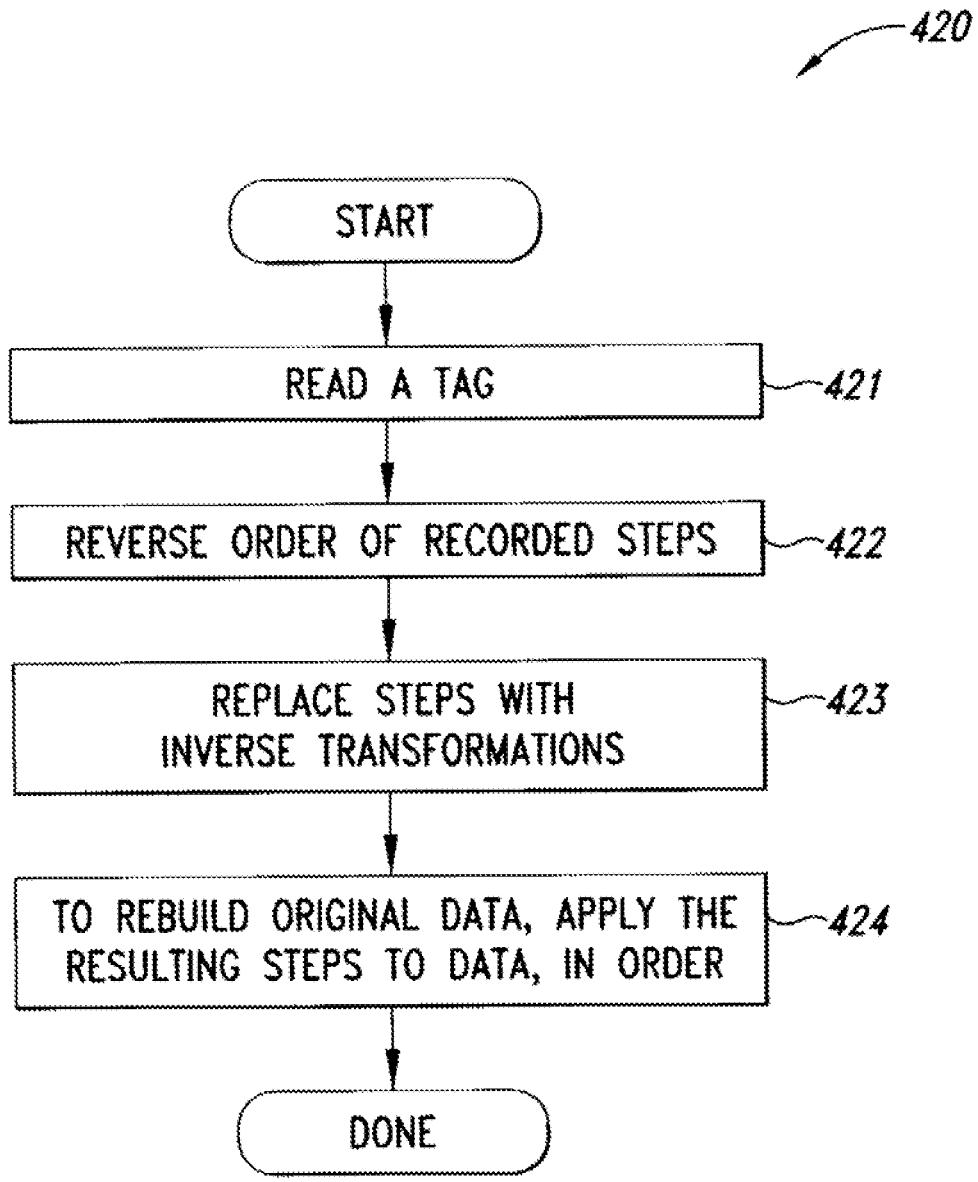
FIG. 28 is a flowchart showing an exemplary tag reader method.

A tag reader method 420, shown in FIG. 28, is used by the tag reader 398 to reassemble inverse transformations that are inverse to those transformations recorded in a tag produced by one of the tag generators 172. The tag reader 398 reads a tag (step 421) to obtain a list identifiers of transformations performed during the shredding process and produces a reverse list of transformations that has a reverse order of the transformation identifiers recorded in the tag (step 422). Following the order of the transformation identifiers in the reverse list, each transformation identifier is then replaced by an identifier of a corresponding inverse transformation (step 423) to generate an inverse transformation list. The inverse transformer associated with the particular tag reader then performs inverse transformations on data read into the inverse transformer according to the produced inverse transformation list (step 424) and the method 420 ends. The inverse transformation list can be as detailed as needed to redo the various transformations that occurred during the shredding process even if the types of transformations changed from data block to data block or at a lower level.

Figure 29:
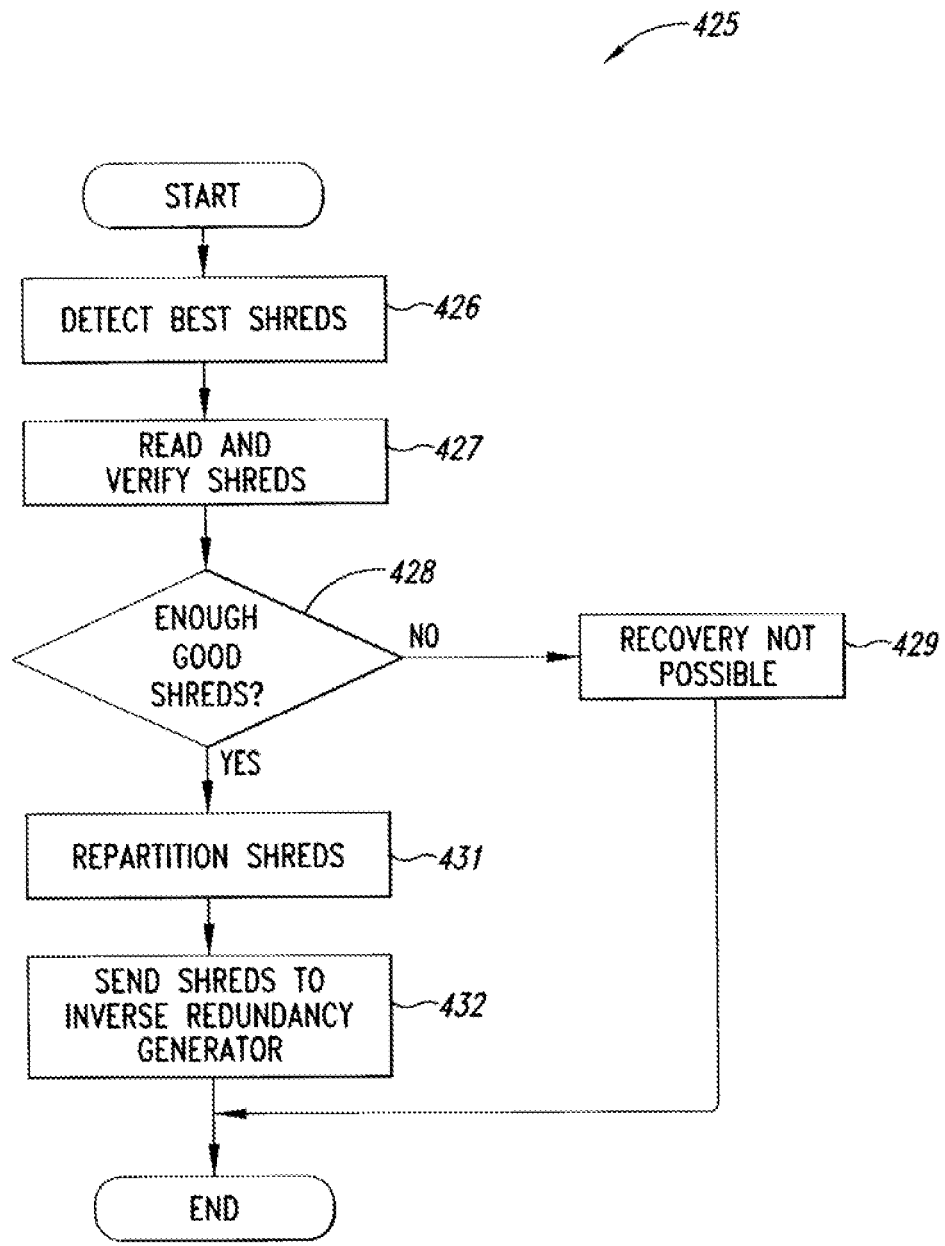
FIG. 29 is a flowchart showing an exemplary third inverse transformer method.

A third inverse transformer method 425, shown in FIG. 29, detects best shreds (step 426), which is based upon factors such as availability and level of response provided by the various storage units 150, type of encoding used for various of the shreds 156 stored in the stored units, and comparable size of the shreds available. The method 425 then reads in the chosen of the shreds 156 and signature verification is performed if a signature was generated by the third-tier components 166 (step 427). A determination is made as to whether a sufficient number of the shreds 156 are available to reconstruct the input data 139. If not (NO branch of decision step 428), indication is made that recovery is not possible (step 429) and the method ends. Otherwise (YES branch of decision step 428), those of the shreds 156 read in by the third inverse transformer 408 are reformatted (step 431), which is the inverse of partitioning data to the available storage units 150 (step 356 of the third transformer method 350 shown in FIG. 23) to reassemble the shreds for further processing. The shreds 156 being reformatted are then sent to the inverse redundancy generator 406.

Figure 30:
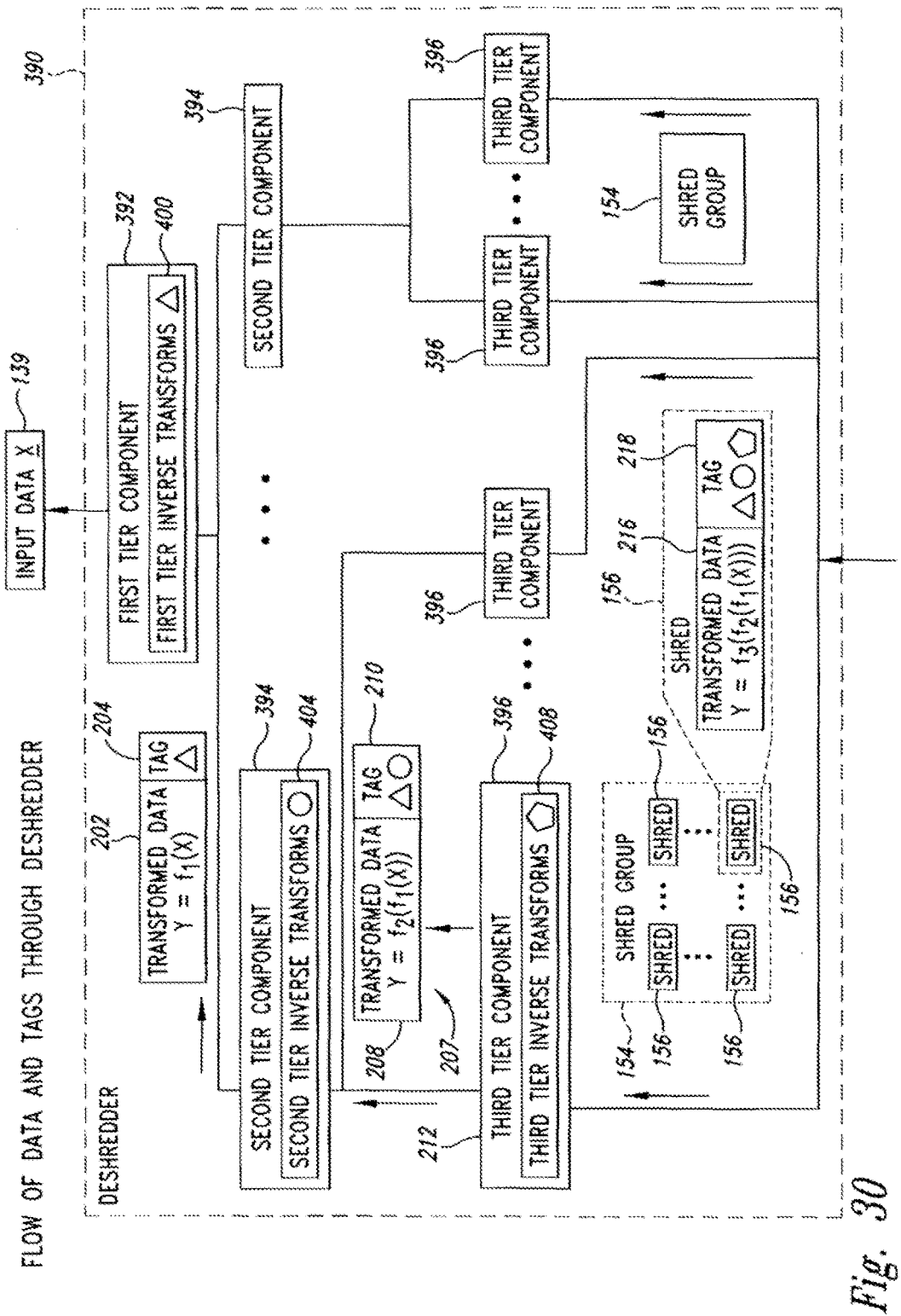
FIG. 30 is a schematic showing an exemplary flow of data and tags through a deshredder.

A flow of data and tags through the deshredder 390, shown in FIG. 30, is similar to the flow of data and tags through the shredder 160, shown in FIG. 9, in that the data and tags in both flow diagrams are the same. As evident in FIGS. 9 and 30, the data and tags in the deshredder 390 are flowing in a direction opposite to that of the data and tags in the shredder 160 and that inverse transforms are being used in the deshredder opposite to the transforms used in the shredder.

Figure 31:
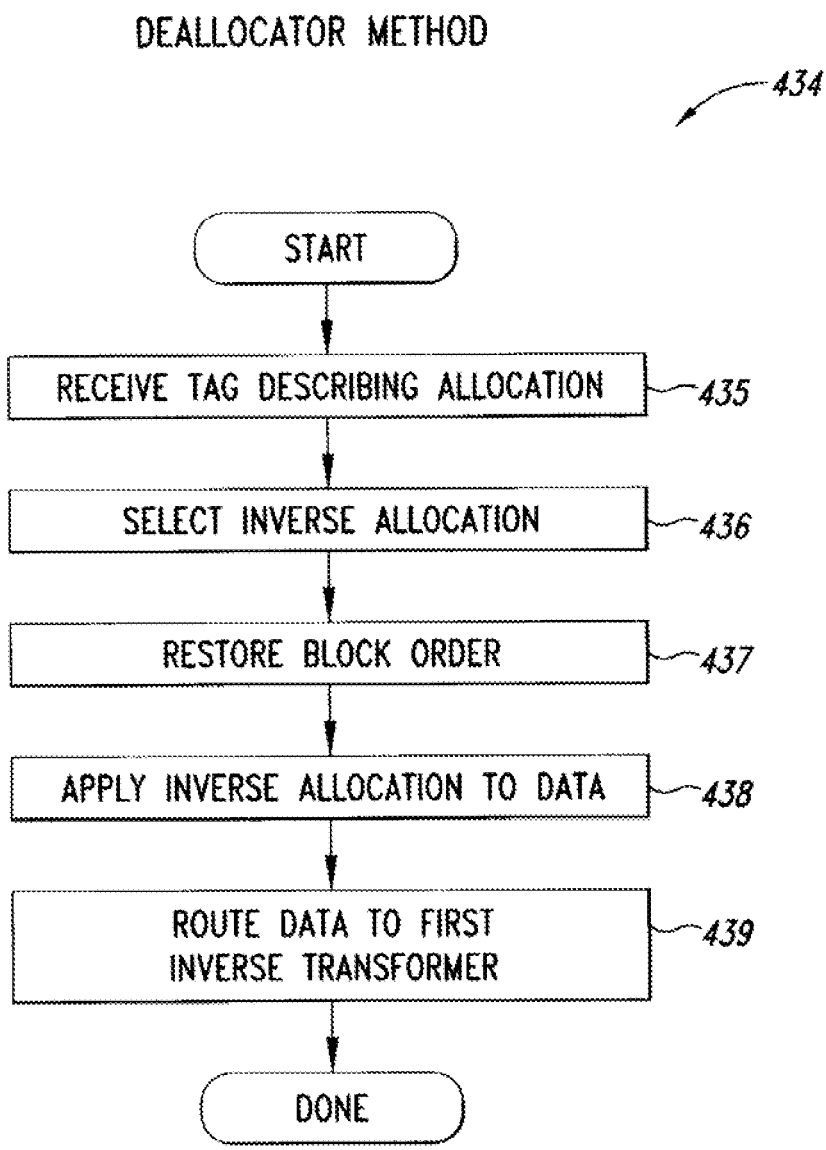
FIG. 31 is a flowchart showing an exemplary deallocator method.

A deallocator method 434 used by the deallocator 402, shown in FIG. 31, receives a tag (step 435) describing the allocation function performed by the first-tier component 162, such as the tag 204 outputted by the first-tier component 162 shown in the exemplary flow of data and tags through the shredder 160 in FIG. 9. The deallocator 430 selects an inverse allocation function opposite to the described allocation function (step 436), restores data block order (step 437), and applies the inverse allocation function to the data received by the first-tier component 392 of the deshredder 390 (step 438). After performing the inverse deallocation function, the deallocator 402 sends the inverse deallocated data to the first inverse transformer 400 (step 439) and the method 430 ends.

Figure 32:
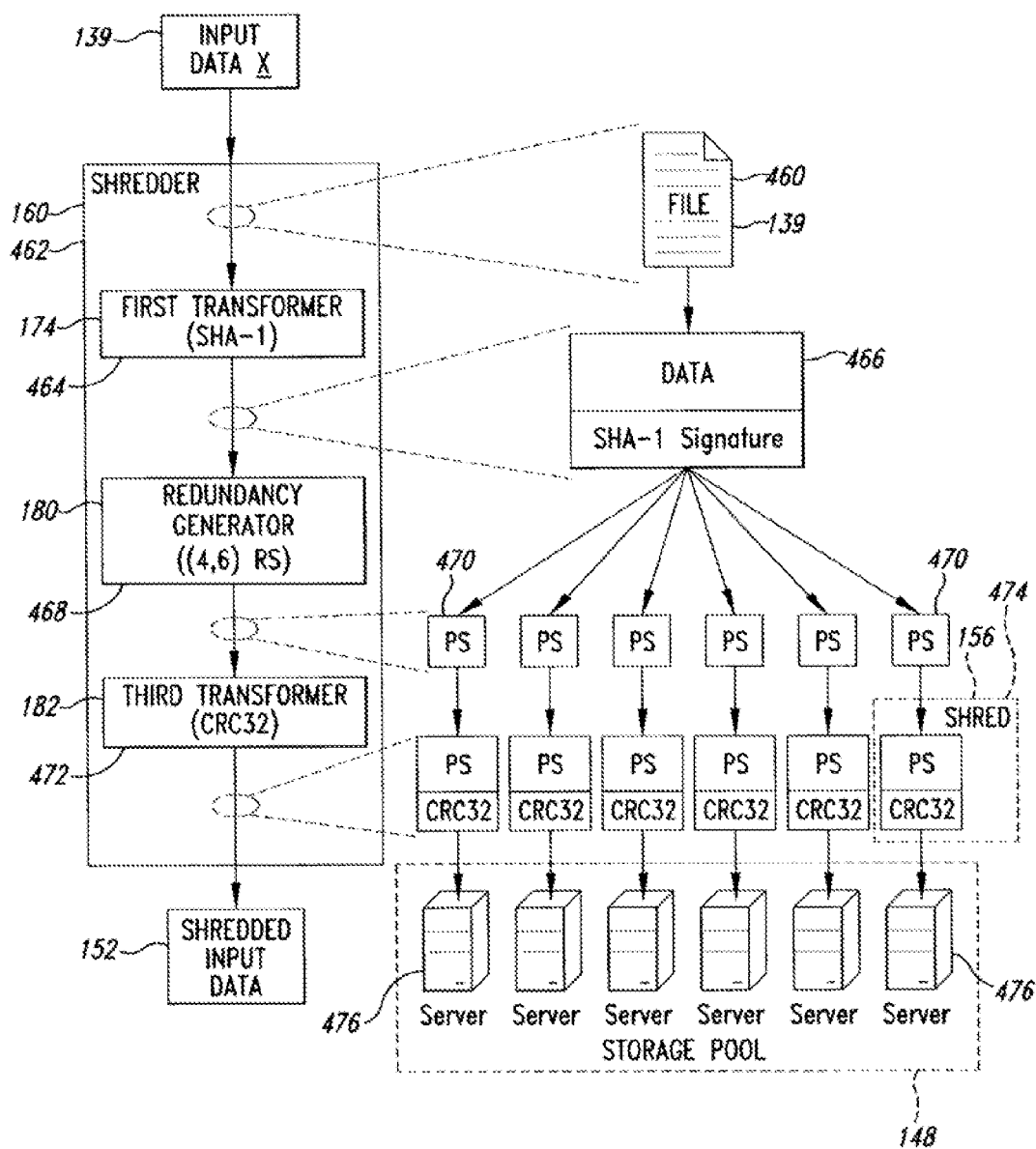
FIG. 32 is a schematic showing an exemplary shredding by first and third transformers without allocation.

An exemplary depiction of a shredder 462 shredding without allocation, shown in FIG. 32, has a first transformer 464, which receives the input data 139 consisting in this example as a data file 460 and uses a SHA-1 signature generation function to generate a signature associated with the received data to generate a pre-shred 466 containing the received data and a tag of the SHA-1 signature. In this example, a redundancy generator 468 is located in the first-tier component 162 along with the first transformer 174. The redundancy generator 468 receives the data file 460 and uses a 4 input-6 output Reed Solomon redundancy generation function with systematic encoding to generate six pre-shreds 470 with four of the pre-shreds containing direct pass-through data blocks of the data file and two of the pre-shreds being generated from combinations of data blocks from the data file for redundancy purposes. Other exemplary implementations use Reed Solomon redundancy generation functions with non-systematic encoding.

Either one third transformer 472 sequentially, six third transformers in parallel, or two to five third transformers in a sequential-parallel combination receive the six pre-shreds 470. The third transformer(s) 472 uses a CRC32 signature generation function to generate a CRC32 signature for each of the pre-shreds 470 to form shreds 474, which includes the pre-shred data, the CRC32 signature information and other tag information (not shown). The shreds 474 are then sent to the storage pool 148 where in this instance is made up of six servers 476.

Figure 33:
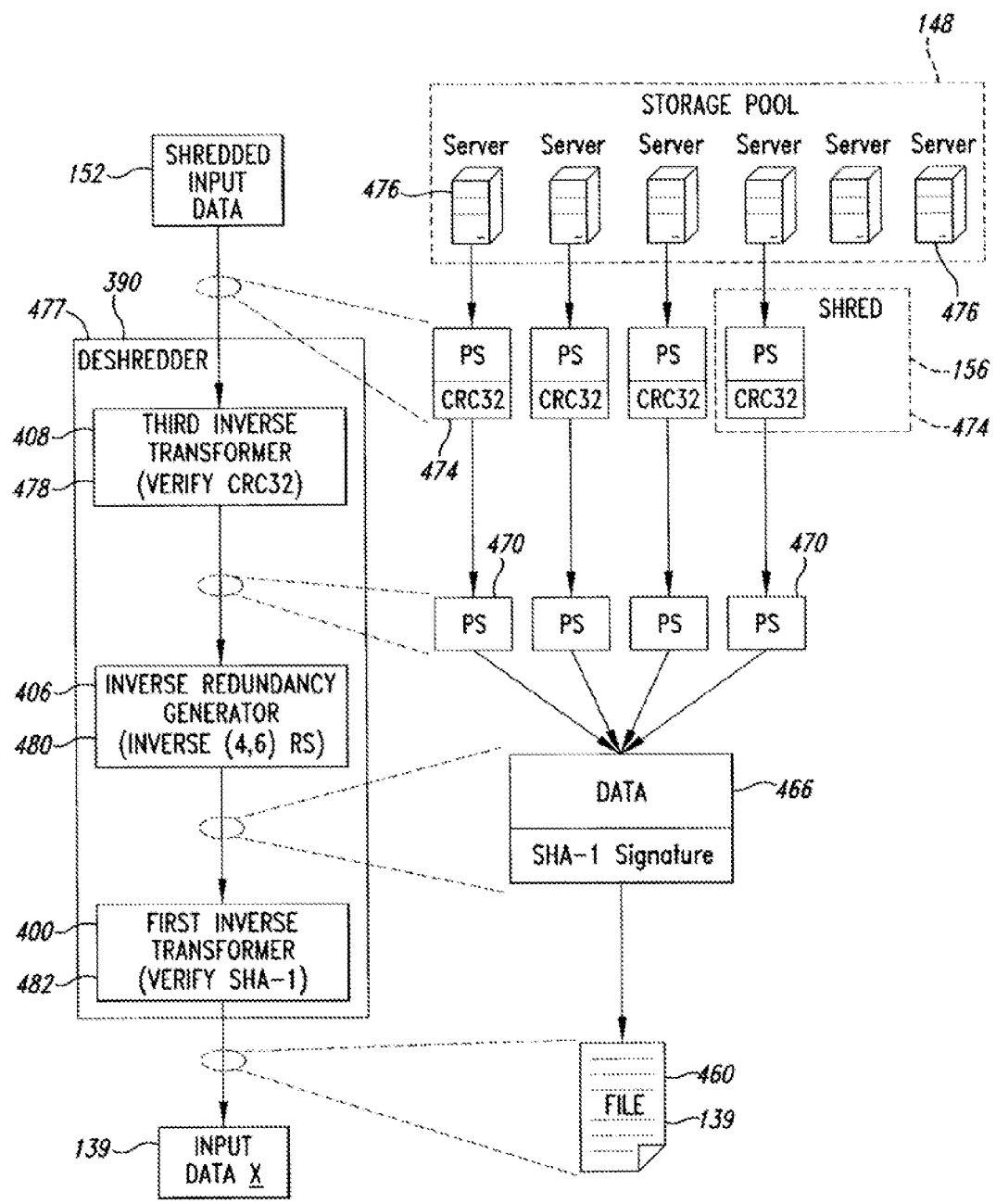
FIG. 33 is a schematic showing an exemplary deshredding by first and third transformers without deallocation.

Complementary to the shredder 462, an exemplary depiction of a deshredder 477 that deshreds without de-allocation, shown in FIG. 33, receives four of the shreds 474 from four of the servers 476. Either one third inverse transformer 472 sequentially, four third inverse transformers in parallel, or two to three third inverse transformers in a sequential-parallel combination receive the four shreds 474.

Since the tags of the received shreds 474 contain information that a CRC32 signature generation function was used by the third transformer 472 during the complementary shredding process, the third inverse transformer(s) 478 use a CRC32 signature verification function to verify that data of the received shreds is not corrupted. If data has not been corrupted, the four pre-shreds 470 are then sent on to a inverse redundancy generator 480 of the first-tier component 392 of the deshredder 477 to perform a inverse Reed Solomon redundancy function on the four pre-shreds to reconstruct the pre-shred 466 containing data and a tag indicating that SHA-1 signature generation was performed by the first transformer 464 during shredding. The tag associated with the pre-shred 466 is then read by a first inverse transformer 482 of the first-tier component 392, which then performs an SHA-1 signature verification function to verify that the data of the pre-shred 466 is uncorrupted and if so, the data file 460 is outputted by the deshredder 477 as the input data 139.

Figure 34:
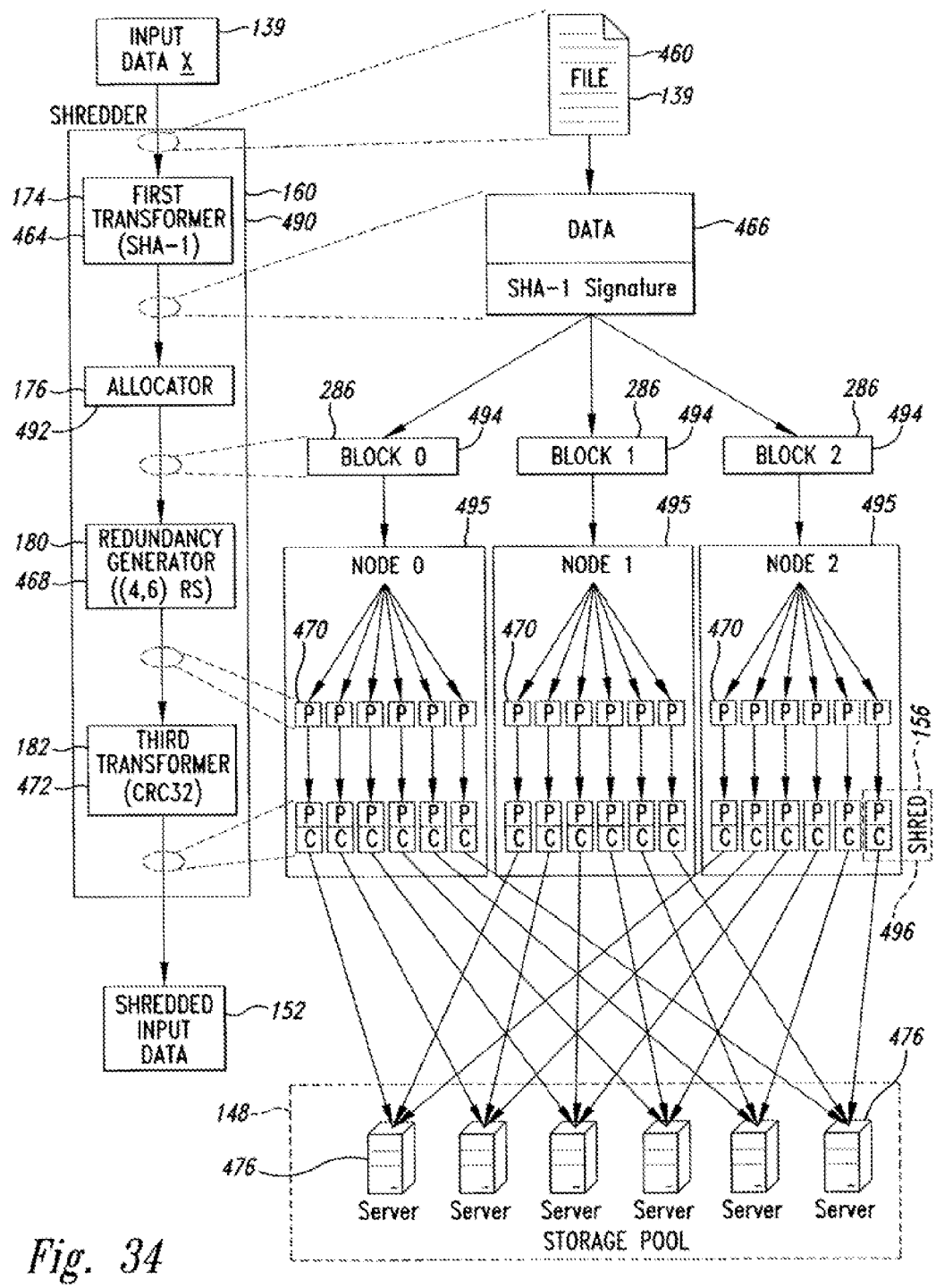
FIG. 34 is a schematic showing an exemplary shredding by first and third transformers with allocation.

An exemplary depiction of an exemplary shredder 490 shredding with allocation, shown in FIG. 34, is similar to the exemplary shredder 462 shredding without allocation, shown in FIG. 32, except for an addition of an allocator 492 in the first-tier component 162 of the shredder 490. The allocator 492 splits the pre-shred 466 into three data blocks 494, which are sent on to three redundancy generators 468 each located in three of the second-tier components 164. Each of the three data blocks is then processed in parallel with the other two data blocks in a similar manner performed on the entire pre-shred 466 by the shredder 462 of FIG. 32. For each data block there is one of the redundancy generators 468, and up to six of the third transformers 472. Each of the three data blocks 494 results in six shreds 156 being stored on the six servers 476.

Figure 35:
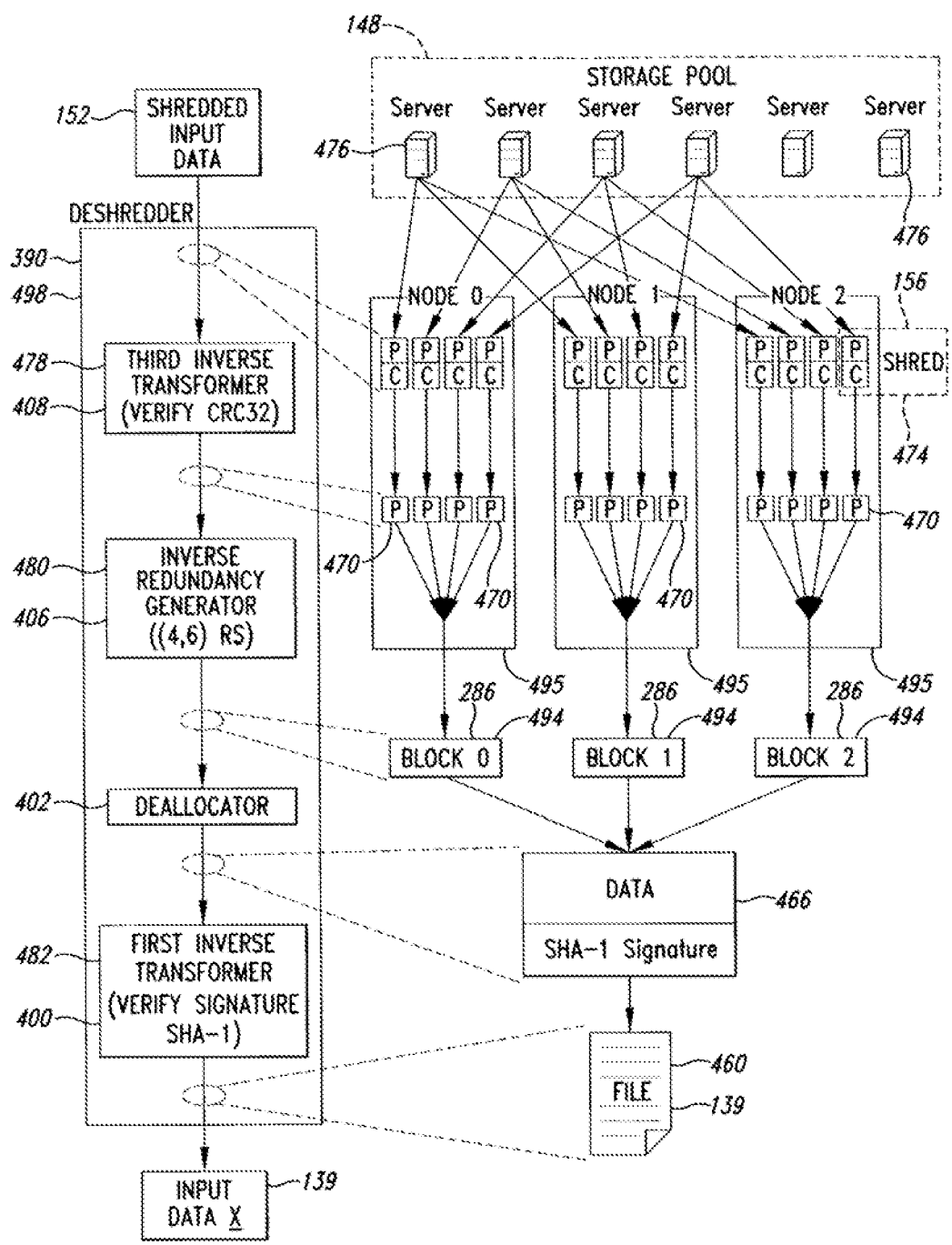
FIG. 35 is a schematic showing an exemplary deshredding by first and third transformers with deallocation.

An exemplary deshredder 498, shown in FIG. 35, is complementary to the exemplary shredder 490, shown in FIG. 34. The deshredder 498 is similar to the deshredder 477, shown in FIG. 33, except that the deshredder 498 has up to twelve of the third inverse transformers 478 to receive twelve shreds 156, up to three inverse redundancy generators 480 in the second-tier component 394 of the deshredder 498 to receive the three data blocks 494, and an implementation of the deallocator 402 in the first-tier component 392 to reassemble the data blocks into the pre-shred 466.

Figure 36:
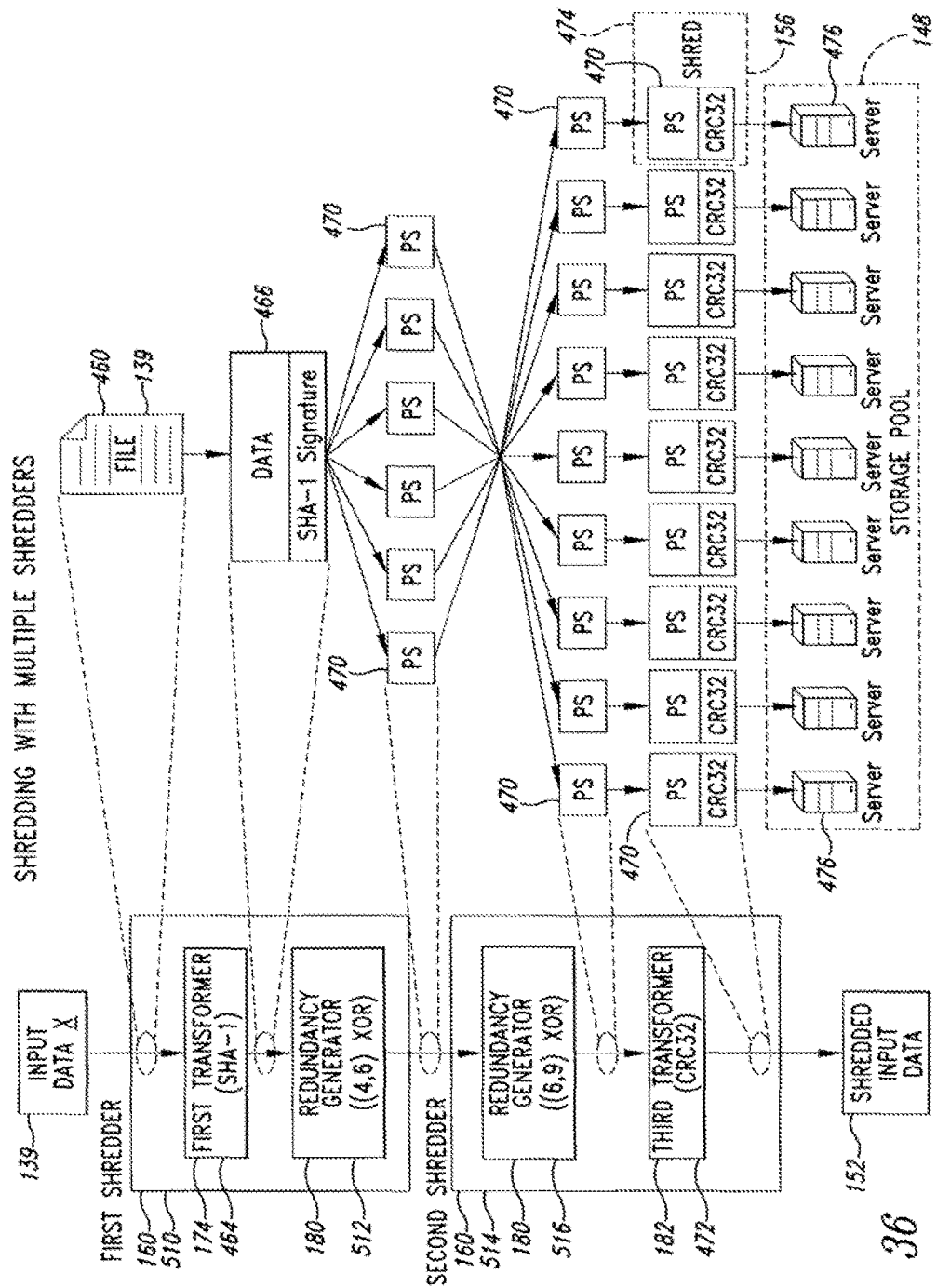
FIG. 36 is a schematic showing an exemplary shredding with multiple shredders.
Figure 37:
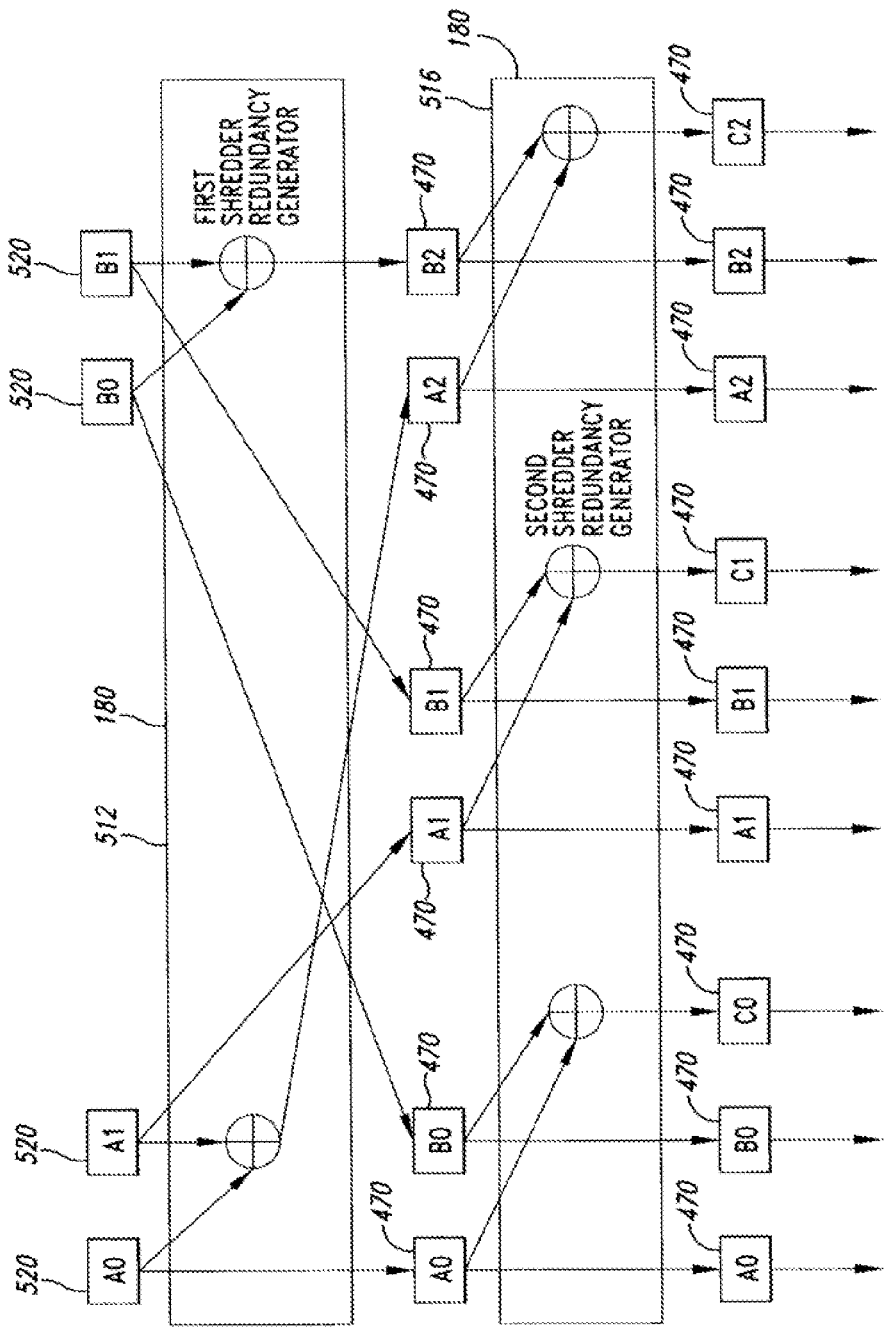
FIG. 37 is a schematic showing an exemplary combination of redundancy generators for use in multi-level shredders.

An exemplary implementation of multi-level shredding and deshredding, shown in FIGS. 36 and 37, use much of the exemplary SHA-1 and CRC32 discussed in the above examples. This implementation of multi-level shredding has a first shredder 510 with a first redundancy generator 512 using a 4 input-6 output XOR redundancy function to feed a second shredder 514 using a second redundancy generator 516 using a 6 input-9 output XOR redundancy function to output nine of the pre-shreds 470, which are subsequently stored on nine of the servers 476.

An exemplary illustration of how redundancy generation of the first redundancy generator 512 could be combined with redundancy generation of the second redundancy generator 516, shown in FIG. 37, has both direct pass-through data blocks outputted as the pre-shreds 470 from inputs 520 and data blocks generated from combinations of the inputs to be outputted as other of the pre-shreds.

Figure 38:
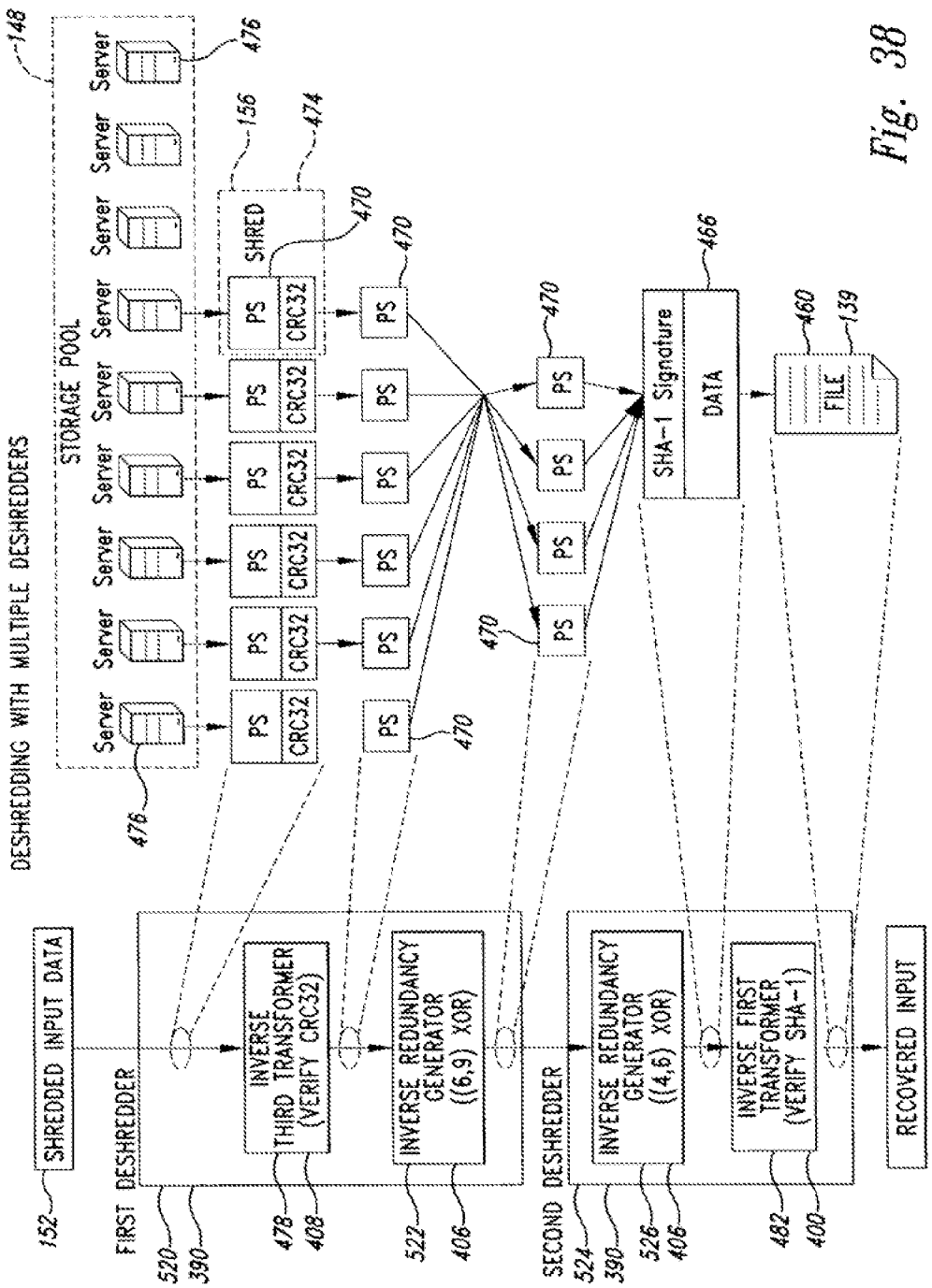
FIG. 38 is a schematic showing an exemplary deshredding with multi-level deshredders.

A first deshredder 520, shown in FIG. 38, has an inverse redundancy generator 522, complementary to the second redundancy generator 516 of the second shredder 514, that receives six of the shreds 155 after a signature verification is performed. A second deshredder 524 has a second inverse redundancy generator, complementary to the first redundancy generator 512 of the first shredder 510, that receives pre-shreds 470 from the first deshredder 520.

Figure 39:
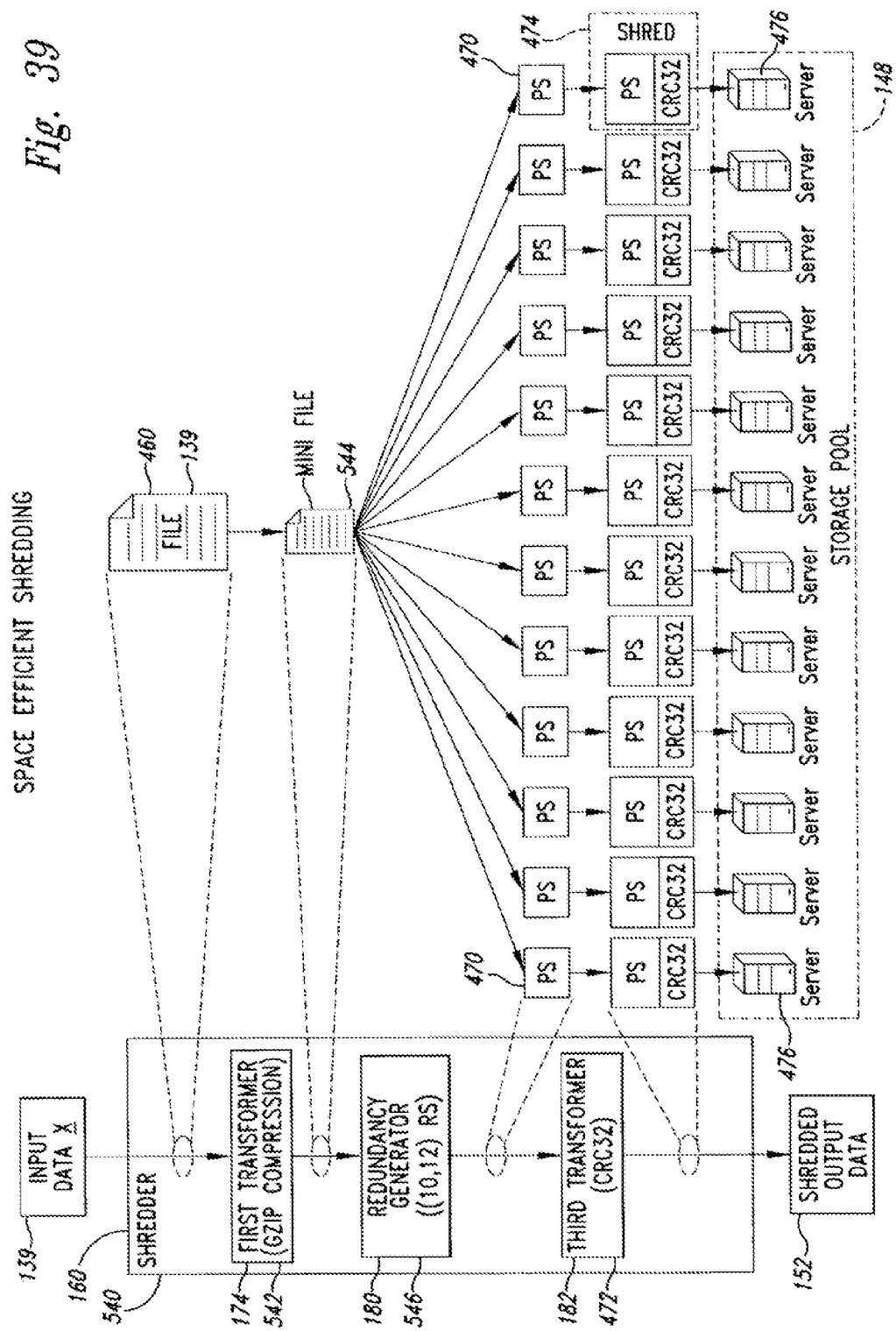
FIG. 39 is a schematic showing an exemplary space efficient shredding.
Figure 40:
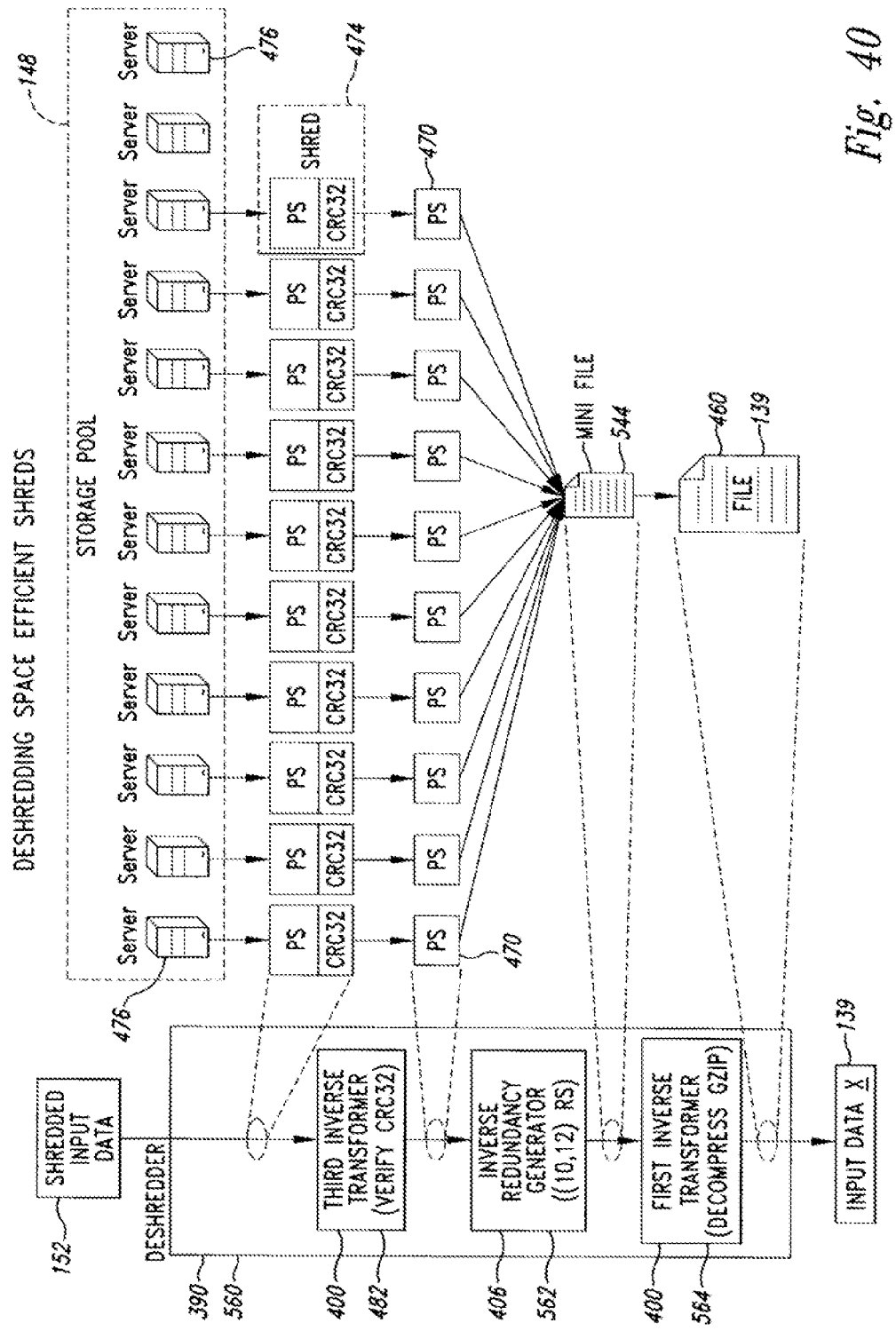
FIG. 40 is a schematic showing an exemplary deshredding of space efficient shreds.

An exemplary illustration of an implementation of shredding and deshredding that emphasizes space efficient storage is shown in FIGS. 39 and 40. A shredder 540 has a first transformer 542 that performs a GZIP compression function to generate a mini file 544 from an input file 460. The shredder 540 also has a redundancy generator 546 that uses a 10 input-12 output Reed Solomon redundancy generation function to generate twelve pre-shreds 470 from the mini file 544. Compression before redundancy generation helps to reduce processing time and storage space requirements. A deshredder 560 has an inverse redundancy generator 562 complementary to the redundancy generator 546 of the shredder 540 and an first inverse transformer 400 that performs a GZIP decompression function 564 complementary to GZIP compression function performed by the first transformer 542 of the shredder 540.

The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Those skilled in the art will recognize that the embodiments disclosed herein, in whole or in part, can be equivalently implemented in integrated circuits, as one or more computer programs running on one or more computers (e.g., as one or more programs running on one or more data processing systems), as one or more programs running on one or more controllers (e.g., microcontrollers) as one or more programs running on one or more processors e.g., microprocessors, as firmware, or as virtually any combination thereof, and that designing the circuitry and/or writing the code for the software and or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analogue communication links using TDM or IP based communication links (e.g., packet links).

In a general sense, those skilled in the art will recognize that the various embodiments described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into data processing systems. That is, the devices and/or processes described herein can be integrated into a data processing system via a reasonable amount of experimentation.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. Note: it will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method of deshredding data for execution by a device that includes one or more processors and one or more memory devices, the method comprises:

retrieving, from storage units, at least a decode threshold number of encoded data elements of a set of encoded data elements representing at least a first piece of data, wherein a separate piece of data was also encoded into the set of encoded data elements, the separate piece of data including one or more tags with information describing how the encoded data elements were created, the one or more tags used to indicate which of one or more functions should be performed in various stages of deshredding to reconstruct the at least first piece of data, the information including identifiers for the one or more functions performed on the data, the functions including any of: compression, encryption or signature generation and wherein the decode threshold number of encoded data elements corresponds to a minimum number of encoded data elements that are needed to recover the separate piece of data, and wherein no one storage unit of the storage units stores a sufficient number of encoded data elements to recover the separate piece of data and wherein the separate piece of data was encoded by one or more shredders and subsequently stored by the storage units;

performing a second inverse redundancy function on the at least the decode threshold number of encoded data elements to produce data elements, wherein the data elements include one or more inputs of data of a set of inputs of data and one or more first redundancy data elements;

performing a first inverse redundancy function on the data elements to recover the set of inputs of data;

combining the set of inputs of data into the separate piece of data; and wherein the separate piece of data is used in one or more of: data decompression, data decryption or signature verification.

2. The method of claim 1 further comprises:

the first inverse redundancy function corresponding to an inverse of a first redundancy function that includes exclusively ORing at least two inputs of data of the set of inputs of data to produce a first redundancy element of the one or more first redundancy elements; and the second inverse redundancy function corresponding to an inverse of a second redundancy function that includes exclusively ORing at least two data elements of the set of data elements to produce an encoded data element of the set of encoded data elements.

3. The method of claim 2 further comprises:
the first redundancy function including passing through an input of data of the sets of inputs of data as a second redundancy element of the one or more first redundancy elements; and
the second redundancy function including passing through a particular data element of the sets of data elements to produce a second encoded data element of the set of encoded data elements or exclusive ORing the particular data element with zero to produce the second encoded data element.

4. The method of claim 1 further comprises:
the first inverse redundancy function corresponding to an inverse of a first redundancy function;
the second inverse redundancy function corresponding to an inverse of a second redundancy function; and
a matrix model that defines coefficients for exclusive ORing operations of the first and second redundancy functions.

5. The method of claim 1 further comprises:
the first inverse redundancy function corresponding to an inverse of a first redundancy function that includes systematic encoding to produce the one or more first redundancy data elements from at least some inputs of data; and
the second inverse redundancy function corresponding to an inverse of a second redundancy function that includes non-systematic encoding to produce the set of encoded data elements from the at least some data elements.

6. The method of claim 1, wherein the retrieving the at least the decode threshold number of encoded data elements comprises:
retrieving a first encoded data element of the at least the decode threshold number of encoded data elements from a first storage unit of the storage units;
retrieving a second encoded data element of the at least the decode threshold number of encoded data elements from a second storage unit of the storage units; and
retrieving a third encoded data element of the at least the decode threshold number of encoded data elements from a third storage unit of the storage units.

7. The method of claim 1, wherein the retrieving the at least the decode threshold number of encoded data elements comprises:
retrieving first and second encoded data elements of the at least the decode threshold number of encoded data elements from a first storage unit of the storage units;
retrieving a third encoded data element of the at least the decode threshold number of encoded data elements from a second storage unit of the storage units; and
retrieving a fourth encoded data element of the at least the decode threshold number of encoded data elements from a third storage unit of the storage units.

8. The method of claim 1 further comprises:
retrieving, from the storage units, another at least the decode threshold number of encoded data elements of a second set of encoded data elements, wherein a second separate piece of data was encoded into the second set of encoded data elements;
performing the second inverse redundancy function on the other at least the decode threshold number of encoded data elements to produce second data elements;
performing the first inverse redundancy function on the second data elements to recover a second set of inputs of data;
combining the second set of inputs of data into the second separate piece of data; and
combining the separate piece of data and the second separate piece of data into data.

9. A device for deshredding data comprises:
a network interface;
one or more memory devices; and
one or more processors interoperably coupled to the network interface and the one or more memory devices, the one or more processors are operable to:
retrieve, from storage units via the network interface, at least a decode threshold number of encoded data elements of a set of encoded data elements representing at least a first piece of data, wherein a separate piece of data was also encoded into the set of encoded data elements, the separate piece of data including one or more tags with information describing how the encoded data elements were created, the one or more tags used to indicate which of one or a plurality of functions should be performed in various stages of deshredding to reconstruct the at least first piece of data, the information including identifiers for the one or a plurality of functions performed on the data and, for the plurality of functions, an order in which the plurality of functions were performed, the functions including any of: compression, encryption or signature verification and wherein the decode threshold number of encoded data elements corresponds to a minimum number of encoded data elements that are needed to recover the separate piece of data, and wherein no one storage unit of the storage units stores a sufficient number of encoded data elements to recover the separate piece of data and wherein the separate piece of data was encoded by one or more shredders and subsequently stored by the storage units;
perform a second inverse redundancy function on the at least the decode threshold number of encoded data elements to produce data elements, wherein the data elements include one or more inputs of data of a set of inputs of data and one or more first redundancy data elements;
perform a first inverse redundancy function on the data elements to recover the set of inputs of data;
combine the set of inputs of data into the separate piece of data; and
wherein the separate piece of data is used in one or more of: data decompression, data decryption or signature verification.

10. The device of claim 9 further comprises:
the first inverse redundancy function corresponding to an inverse of a first redundancy function that includes exclusively ORing at least two inputs of data of the set of inputs of data to produce a first redundancy element of the one or more first redundancy elements; and
the second inverse redundancy function corresponding to an inverse of a second redundancy function that includes exclusively ORing at least two data elements of the set of data elements to produce an encoded data element of the set of encoded data elements.

11. The device of claim 10 further comprises:
the first redundancy function including passing through an input of data of the sets of inputs of data as a second redundancy element of the one or more first redundancy elements; and
the second redundancy function including passing through a particular data element of the sets of data elements to produce a second encoded data element of the set of encoded data elements or exclusive ORing the particular data element with zero to produce the second encoded data element.

12. The device of claim 9 further comprises:
the first inverse redundancy function corresponding to an inverse of a first redundancy function;
the second inverse redundancy function corresponding to an inverse of a second redundancy function; and
a matrix model that defines coefficients for exclusive ORing operations of the first and second redundancy functions.

13. The device of claim 9 further comprises:
the first inverse redundancy function corresponding to an inverse of a first redundancy function that includes systematic encoding to produce the one or more first redundancy data elements from at least some inputs of data; and
the second inverse redundancy function corresponding to an inverse of a second redundancy function that includes non-systematic encoding to produce the set of encoded data elements from the at least some data elements.

14. The device of claim 9, wherein the one or more processors is further operable to retrieve the at least the decode threshold number of encoded data elements by:
retrieving a first encoded data element of the at least the decode threshold number of encoded data elements from a first storage unit of the storage units;
retrieving a second encoded data element of the at least the decode threshold number of encoded data elements from a second storage unit of the storage units; and
retrieving a third encoded data element of the at least the decode threshold number of encoded data elements from a third storage unit of the storage units.

15. The device of claim 9, wherein the one or more processors is further operable to retrieve the at least the decode threshold number of encoded data elements by:
retrieving first and second encoded data elements of the at least the decode threshold number of encoded data elements from a first storage unit of the storage units;
retrieving a third encoded data element of the at least the decode threshold number of encoded data elements from a second storage unit of the storage units; and
retrieving a fourth encoded data element of the at least the decode threshold number of encoded data elements from a third storage unit of the storage units.

16. The device of claim 9, wherein the one or more processors is further operable to:
retrieve, via the network interface from the storage units, another at least the decode threshold number of encoded data elements of a second set of encoded data elements, wherein a second separate piece of data was encoded into the second set of encoded data elements;
perform the second inverse redundancy function on the other at least the decode threshold number of encoded data elements to produce second data elements;
perform the first inverse redundancy function on the second data elements to recover a second set of inputs of data;
combine the second set of inputs of data into the second separate piece of data; and
combine the separate piece of data and the second separate piece of data into data.

17. One or more memory devices comprises:
a first memory section that stores operational instructions that, when executed by a processor of a device, causes the device to:
retrieve, from storage units, at least a decode threshold number of encoded data elements of a set of encoded data elements, wherein a separate piece of data was encoded into the set of encoded data elements, the separate piece of data including one or more tags with information describing how the encoded data elements were created, the one or more tags used to indicate which of one or more functions should be performed in various stages of deshredding, the information including at least an identifier for a signature generation function performed on the data and wherein the decode threshold number of encoded data elements corresponds to a minimum number of encoded data elements that are needed to recover the separate piece of data, and wherein no one storage unit of the storage units stores a sufficient number of encoded data elements to recover the separate piece of data and wherein the separate piece of data was encoded by one or more shredders and subsequently stored by the storage units;
a second memory section that stores operational instructions that, when executed by the processor of the device, causes the device to:
perform a second inverse redundancy function on the at least the decode threshold number of encoded data elements to produce data elements, wherein the data elements include one or more inputs of data of a set of inputs of data and one or more first redundancy data elements; and
perform a first inverse redundancy function on the data elements to recover the set of inputs of data; and
a third memory section that stores operational instructions that, when executed by the processor of the device, causes the device to:
combine the set of inputs of data into the separate piece of data; and
wherein the separate piece of data is used for signature verification.

18. The one or more memory devices of claim 17 further comprises:
the first inverse redundancy function corresponding to an inverse of a first redundancy function that includes exclusively ORing at least two inputs of data of the set of inputs of data to produce a first redundancy element of the one or more first redundancy elements; and
the second inverse redundancy function corresponding to an inverse of a second redundancy function that includes exclusively ORing at least two data elements of the set of data elements to produce an encoded data element of the set of encoded data elements.

19. The one or more memory devices of claim 17 further comprises:
the first redundancy function including passing through an input of data of the sets of inputs of data as a second redundancy element of the one or more first redundancy elements; and
the second redundancy function including passing through a particular data element of the sets of data elements to produce a second encoded data element of the set of encoded data elements or exclusive ORing the particular data element with zero to produce the second encoded data element.

20. The one or more memory devices of claim 19 further comprises:
the first inverse redundancy function corresponding to an inverse of a first redundancy function;
the second inverse redundancy function corresponding to an inverse of a second redundancy function; and
a matrix model that defines coefficients for exclusive ORing operations of the first and second redundancy functions.

21. The one or more memory devices of claim 17 further comprises:
the first inverse redundancy function corresponding to an inverse of a first redundancy function that includes systematic encoding to produce the one or more first redundancy data elements from at least some inputs of data; and
the second inverse redundancy function corresponding to an inverse of a second redundancy function that includes non-systematic encoding to produce the set of encoded data elements from the at least some data elements.

22. The one or more memory devices of claim 17, wherein the first memory section further stores operational instructions that, when executed by the processor of the device, causes the device to retrieve the at least the decode threshold number of encoded data elements by:
retrieving a first encoded data element of the at least the decode threshold number of encoded data elements from a first storage unit of the storage units;
retrieving a second encoded data element of the at least the decode threshold number of encoded data elements from a second storage unit of the storage units; and
retrieving a third encoded data element of the at least the decode threshold number of encoded data elements from a third storage unit of the storage units.

23. The one or more memory devices of claim 17, wherein the first memory section further stores operational instructions that, when executed by the processor of the device, causes the device to retrieve the at least the decode threshold number of encoded data elements by:
retrieving first and second encoded data elements of the at least the decode threshold number of encoded data elements from a first storage unit of the storage units;
retrieving a third encoded data element of the at least the decode threshold number of encoded data elements from a second storage unit of the storage units; and
retrieving a fourth encoded data element of the at least the decode threshold number of encoded data elements from a third storage unit of the storage units.

24. The one or more memory devices of claim 17 further comprises:
the first memory section further stores operational instructions that, when executed by the processor of the device, causes the device to:
retrieve, from the storage units, another at least the decode threshold number of encoded data elements of a second set of encoded data elements, wherein a second separate piece of data was encoded into the second set of encoded data elements;
the second memory section further stores operational instructions that, when executed by the processor of the device, causes the device to:
perform the second inverse redundancy function on the other at least the decode threshold number of encoded data elements to produce second data elements; and
perform the first inverse redundancy function on the second data elements to recover a second set of inputs of data;
the third memory section further stores operational instructions that, when executed by the processor of the device, causes the device to:
combine the second set of inputs of data into the second separate piece of data; and
combine the separate piece of data and the second separate piece of data into data.

* * * * *